US012604911B2

(12) United States Patent
Kim et al.

(10) Patent No.: US 12,604,911 B2
(45) Date of Patent: Apr. 21, 2026

(54) STERILIZATION MODULE AND CART PROCESSING MODULE

(71) Applicant: CJ CHEILJEDANG CORPORATION, Seoul (KR)

(72) Inventors: Jae Gyoung Kim, Suwon-si (KR); Si Ho Yu, Suwon-si (KR); Chun Myung Choi, Suwon-si (KR); Jung Chul Lee, Ulsan (KR); Jung Won Kim, Changwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 903 days.

(21) Appl. No.: 17/905,437

(22) PCT Filed: Mar. 2, 2021

(86) PCT No.: PCT/KR2021/002569
§ 371 (c)(1),
(2) Date: Sep. 1, 2022

(87) PCT Pub. No.: WO2021/177702
PCT Pub. Date: Sep. 10, 2021

(65) Prior Publication Data
US 2023/0086067 A1 Mar. 23, 2023

(30) Foreign Application Priority Data
Mar. 2, 2020 (KR) ........................ 10-2020-0026232

(51) Int. Cl.
*A23B 2/00* (2025.01)
*A23B 2/37* (2025.01)

(52) U.S. Cl.
CPC ................ *A23B 2/001* (2025.01); *A23B 2/37* (2025.01); *A23V 2002/00* (2013.01)

(58) Field of Classification Search
CPC ........... A23B 2/001; A23B 2/37; B65B 55/12
See application file for complete search history.

(56) References Cited

U.S. PATENT DOCUMENTS

| | | | | |
|---|---|---|---|---|
| 1,409,286 A | * | 3/1922 | Diner ....................... | A24B 3/18 99/473 |
| 1,709,175 A | * | 4/1929 | Huygen ................... | A23B 2/37 99/371 |

(Continued)

FOREIGN PATENT DOCUMENTS

| | | |
|---|---|---|
| CN | 104373456 A | 2/2015 |
| CN | 207622509 U | 7/2018 |

(Continued)

OTHER PUBLICATIONS

JP2016104083A Translation (Year: 2016).*

(Continued)

*Primary Examiner* — Woody A Lee, Jr.
(74) *Attorney, Agent, or Firm* — Merchant & Gould P.C.

(57) ABSTRACT

A sterilization module according to the present invention comprises: a sterilization housing that has an inner space capable of accommodating a cart; a sterilization heat treatment machine for heat-treating the cart accommodated in the inner space of the sterilization; a connection part that is provided in the inner space of the sterilization housing and moves the cart forward; and a rotation part that rotates the cart with respect to a cart rotary shaft, which is a predetermined rotary shaft, while gripping the cart.

17 Claims, 21 Drawing Sheets

(56) References Cited

U.S. PATENT DOCUMENTS

| | | | | |
|---|---|---|---|---|
| 2,734,826 A * | 2/1956 | Name not available | .................... | |
| | | | | A23B 2/30 |
| | | | | 219/385 |
| 4,059,919 A * | 11/1977 | Green | ........................ A23L 5/55 | |
| | | | | 99/356 |
| 4,170,421 A * | 10/1979 | Balding | .................... A61L 2/07 | |
| | | | | 366/144 |
| 4,646,629 A * | 3/1987 | Creed | ........................ A23B 2/20 | |
| | | | | 99/468 |
| 5,059,392 A * | 10/1991 | Wijts | ........................ A23B 2/30 | |
| | | | | 99/468 |
| 5,526,736 A * | 6/1996 | Buriani | .................. A23B 2/425 | |
| | | | | 426/511 |
| 6,867,393 B1 * | 3/2005 | Lewis | ........................ A61L 2/07 | |
| | | | | 422/26 |
| 8,262,987 B2 * | 9/2012 | Tago | ........................ A23B 2/37 | |
| | | | | 422/26 |
| 8,277,754 B2 * | 10/2012 | Roumagnac | .............. A61L 2/07 | |
| | | | | 422/500 |
| 8,394,335 B2 * | 3/2013 | Greve | ........................ A61L 2/07 | |
| | | | | 366/144 |
| 2009/0249863 A1 | 10/2009 | Kim et al. | | |
| 2009/0311131 A1 | 12/2009 | Tago et al. | | |

FOREIGN PATENT DOCUMENTS

| | | | | | |
|---|---|---|---|---|---|
| CN | 111407902 A | * | 7/2020 | .............. | E05F 15/42 |
| DE | 102014019774 A1 | * | 5/2016 | ............. | A61B 1/123 |
| EP | 1236536 A1 | | 9/2002 | | |
| JP | S60-182951 A | | 9/1985 | | |
| JP | H07-265025 A | | 10/1995 | | |
| JP | 2549271 B2 | | 10/1996 | | |
| JP | H09-215733 A | | 8/1997 | | |
| JP | 3107306 B1 | | 11/2000 | | |
| JP | 2001-299301 A | | 10/2001 | | |
| JP | 2002020803 A | | 1/2002 | | |
| JP | 2004305001 A | | 11/2004 | | |
| JP | 2005170421 A | | 6/2005 | | |
| JP | 3676494 B2 | | 7/2005 | | |
| JP | 2008295416 A | | 12/2008 | | |
| JP | 4446522 B2 | | 4/2010 | | |
| JP | 4938410 B2 | | 5/2012 | | |
| JP | 5028377 B2 | | 9/2012 | | |
| JP | 2014-100071 A | | 6/2014 | | |
| JP | 2016104083 A | * | 6/2016 | | |
| JP | 6131238 B2 | | 5/2017 | | |
| JP | 6283926 B2 | | 8/2018 | | |
| KR | 2019980021794 U | | 7/1998 | | |
| KR | 20080006546 U | * | 12/2008 | .............. | A61L 2/07 |
| KR | 2020080006546 U | | 12/2008 | | |
| KR | 2020090001544 U | | 2/2009 | | |
| KR | 20090036550 A | | 4/2009 | | |
| KR | 100959388 B1 | | 5/2010 | | |
| KR | 20100134842 A | | 12/2010 | | |
| KR | 20110016542 A | | 2/2011 | | |
| WO | WO-2021177700 A1 | * | 9/2021 | .............. | A61L 2/04 |

OTHER PUBLICATIONS

Office Action issued on Mar. 31, 2023 for the corresponding Chinese patent application 202180018659.8 (10 Pages).

Office Action issued on Aug. 15, 2023 for the corresponding Japanese patent application 2022-552681 (12 pages Including Machine Translation).

PCT International Search Report for PCT Application No. PCT/KR2021/002569 mailed Jun. 14, 2021 (5 pages, with English translation).

PCT Written Opinion for PCT Application No. PCT/KR2021/002569 mailed Jun. 14, 2021 (4 pages).

Extended European Search Report issued on Feb. 22, 2024 for the corresponding European Patent Application No. 21764491.3 (8 pages).

* cited by examiner

A-A'

STERILIZATION MODULE AND CART PROCESSING MODULE

CROSS-REFERENCE TO RELATED APPLICATIONS

This application is a National Stage Application of PCT/KR2021/002569, filed 2 Mar. 2021, which claims priority to Serial No. 10-2020-0026232, filed on 2 Mar. 2020, in the Republic of Korea and which applications are incorporated herein by reference. To the extent appropriate, a claim of priority is made to the above disclosed applications.

TECHNICAL FIELD

The present disclosure relates to a carriage treating module that treats a product loaded in a carriage, and a sterilization module.

BACKGROUND ART

Retort foods refer to foods that are formed by applying heat of a high temperature to sealed food products, sterilizing them, and rapidly cooling them. A retort sterilizer is an apparatus that performs an operation of applying heat of a high temperature to sealed products during a process of manufacturing retort foods.

Various methods have been applied to increase product production efficiency by treating a plurality of products for a short time by sterilizing the products well.

A batch scheme of carrying out all treatment processes including sterilization at once after loading products in carriage and introducing the products into a sterilizer may be used. In this case, because heat efficiency is low, an additional heat treatment time is necessary, and a deviation occurs in distribution of heat so that heating cannot be uniformly.

A continuous scheme of treating products one by one in a separate space while feeding the products continuously may be used. In this case, an entire length of the apparatus may become excessively large and the treatment time may be adjusted only with movement speed, and it is difficult to maintain and repair the apparatus due to a complex structure thereof.

DISCLOSURE

Technical Problem

The present disclosure has been made in an effort to solve the above problems, and provides a carriage treating module that rotates and treats a product loaded in a carriage, and a sterilization module.

Technical Solution

A sterilization module according to an embodiment of the present disclosure includes a sterilization housing having an interior space, in which a carriage is accommodated, a sterilization/heat-treating device that heat-treats the carriage accommodated in the interior space of the sterilization housing, a connection part provided in the interior space of the sterilization housing, and that moves the carriage forwards, and a rotation part that rotates the carriage about a carriage rotary shaft while gripping the carriage.

A carriage treating module according to another embodiment of the present disclosure includes a carriage housing having a carriage space, in which a carriage is accommodated, a connection part disposed in the carriage space, and that moves the carriage forwards, a heat treating device disposed in the carriage space, and that applies a specific heat treatment to a product located in the carriage, and a rotation part that grips the carriage delivered from the connection part, and that rotates the carriage about a carriage rotary shaft in the carriage space.

Advantageous Effects

Accordingly, the loaded products may be uniformly heated rapidly while using the carriage scheme.

MODE FOR INVENTION

Figure 1:
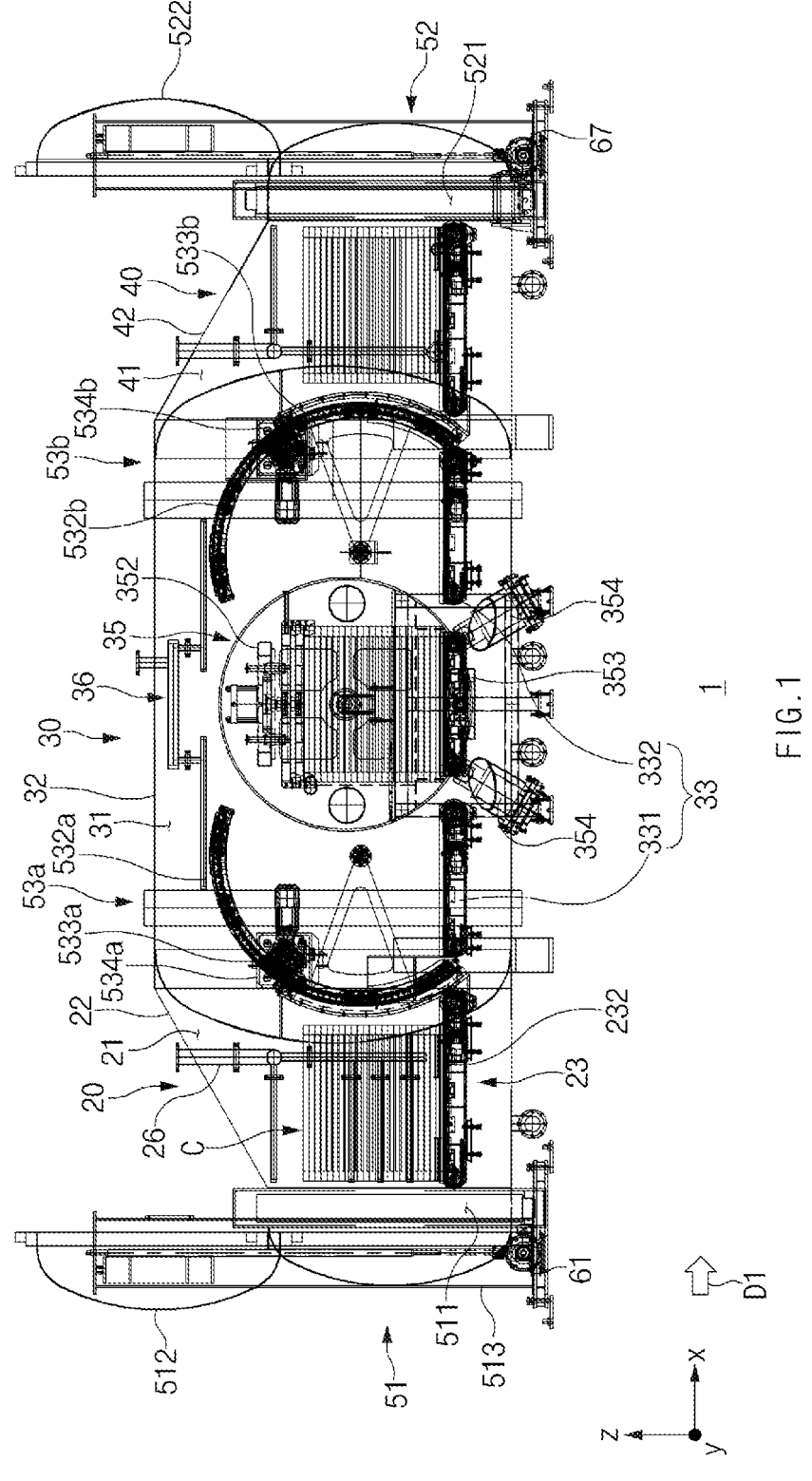
FIG. 1 is a view obtained by cutting a side surface of a housing of a sterilizer in a longitudinal direction according to an embodiment of the present disclosure.

This application claims the benefit of priority to Korean Patent Application No. 10-2020-0026232, filed in the Korean Intellectual Property Office on Mar. 2, 2020, the entire contents of which are incorporated herein by reference.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition terms, such as first, second, A, B, (a), (b) or the like may be used herein when describing components of the present disclosure. The terms are provided only to distinguish the components from other components, and the essences, sequences, orders, and the like of the components are not limited by the terms. When it is described that one element is connected, coupled, or electrically connected to another element, the element may be directly connected or coupled to the other element, but a third element may be connected, coupled, or electrically connected between the elements.

Figure 2:
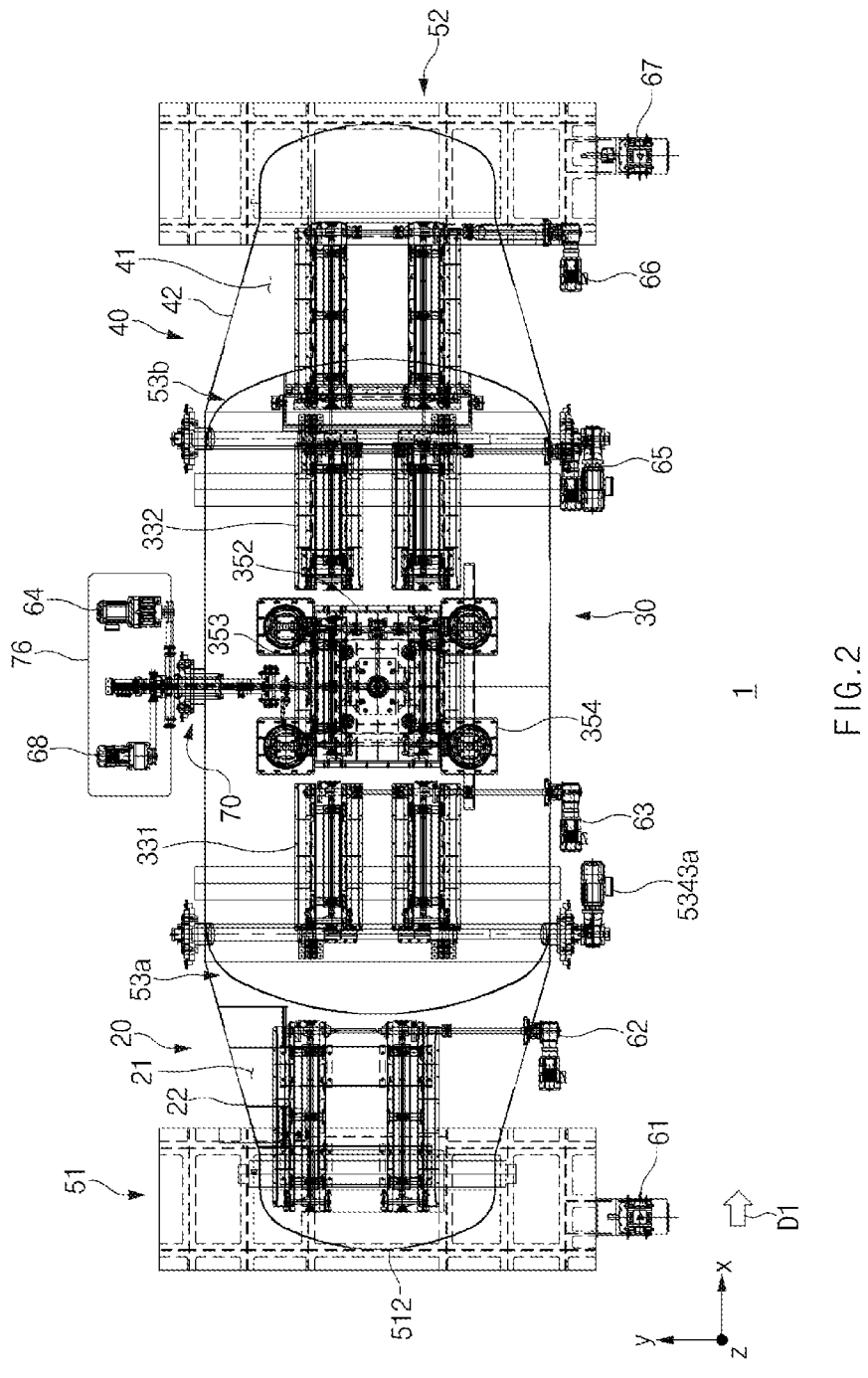
FIG. 2 is a view obtained by cutting an upper surface of a housing of a sterilizer in a transverse direction according to an embodiment of the present disclosure.
Figure 3:
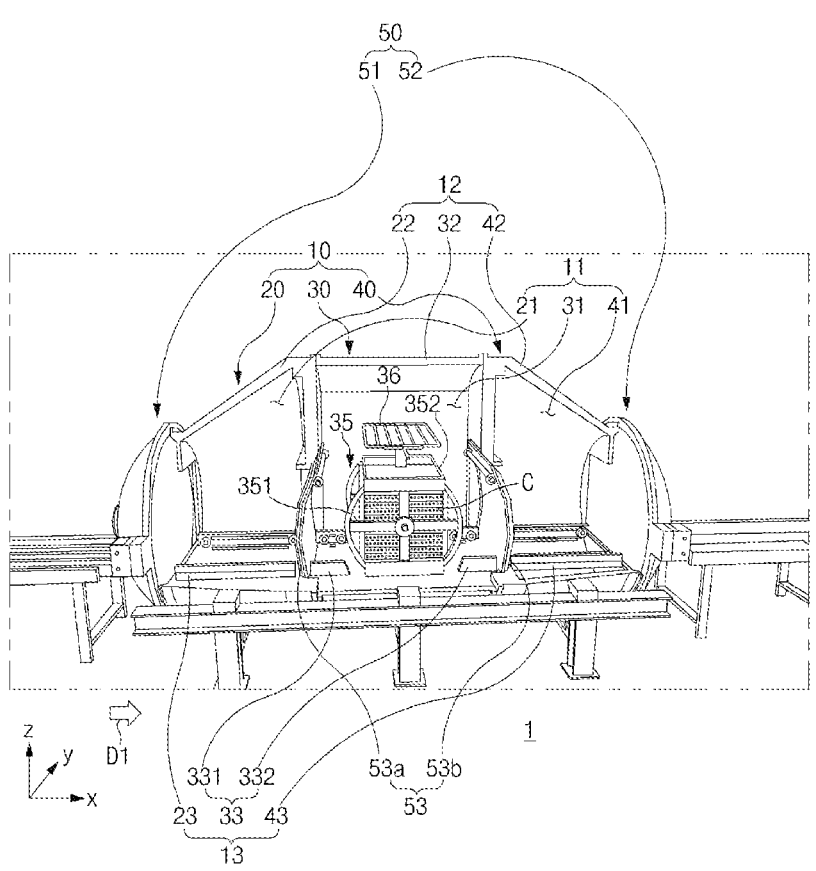
FIG. 3 is a conceptual view illustrating a portion of a housing, which is opened, such that an internal structure of a sterilizer according to an embodiment of the present disclosure is exposed.

FIG. 1 is a view obtained by cutting a side surface of a housing 12 of a sterilizer 1 in a longitudinal direction according to an embodiment of the present disclosure. FIG. 2 is a view obtained by cutting an upper surface of the housing 12 of the sterilizer 1 in a transverse direction according to an embodiment of the present disclosure. FIG. 3 is a conceptual view illustrating a portion of the housing, which is opened, such that an internal structure of the sterilizer according to an embodiment of the present disclosure is exposed.

Referring to the drawings, the sterilizer 1 according to an embodiment of the present disclosure may include a temperature raising module 20, a sterilization module 30, and a cooling module 40, and may further include an opening/closing module 50.

In the specification of the present disclosure, an entrance direction D1 refers to a direction, in which a carriage "C" enters the sterilizer 1, and is a rightward direction of the corresponding drawing and a positive direction in the illustrated x axis, as in arrows illustrating in FIGS. 1 and 2. The positive direction in the illustrated x axis may be a forward direction and a downstream direction along an entrance direction D1, and the negative direction may be a rearward direction and an upstream direction along the entrance direction D1.

In the specification of the present disclosure, the rotational direction is a direction corresponding to an axial direction of rotations of a movement part 13, a sterilization movement part 33, a transfer unit 70, a carriage seating part 353, and the like, which will be described below, when they are rotated, and may be perpendicular to the entrance direction D1 and may be a direction that is parallel to the illustrated y axis. Furthermore, the positive direction in the illustrated y axis may be leftward direction, and the negative direction may be a rightward direction.

Furthermore, the vertical direction may be an upward/downward direction illustrated in FIG. 1, and may be a direction that is perpendicular to the above-described rotational direction and the entrance direction D1 and may be a direction that is parallel to the illustrated z axis. The upward direction may be the positive direction of the z axis and the downward direction may be the negative direction of the z axis. A direction, in which the gravitational force is applied to an object, may be a vertically downward direction, and an opposite direction thereto may be a vertically upward direction. However, this is arbitrarily set to help understanding and description, and the directions are relative, and may vary according to directions and postures, in which the sterilizer 1 is arranged.

The housing 12 of the sterilizer 1 may include a temperature raising housing 22 that is the housing 12 of the temperature raising module 20, a sterilization housing 32 that is the housing 12 of the sterilization module 30, and a cooling housing 42 that is the housing 12 of the cooling module 40, and the housings 12 are connected to each other to constitute the entire housing 12. Although it is illustrated in an embodiment of the present disclosure that the temperature raising module 20, the sterilization module 30, and the cooling module 40 are disposed along the entrance direction D1, but the disposition sequence and the number of the modules are not limited thereto and various combinations are possible.

The temperature raising housing 22 may define an outer wall of a temperature raising space 21 located in an interior thereof, the sterilization housing 32 may define an outer wall of a sterilization space 31 located in an interior thereof, and the cooling housing 42 may define an outer wall of a cooling space 41 located in an interior thereof. Accordingly, the housing 12 may physically separate a sterilizer space 11 located in an interior thereof and an exterior space, and the sterilizer space 11 may include the temperature raising space 21, the sterilization space 31, and the cooling space 41.

The modules are modules that apply at least a heat treatment to a product loaded in the carriage "C", and thus may correspond to a carriage treating module 10. A carriage space "C" located in an interior of the carriage treating module 10 may be formed inside the housing 12. The carriage space may include the sterilizer space 11. That is, the temperature raising module 20, the sterilization module 30, and the cooling module 40 may be referred to as the carriage treating modules 10, the temperature raising space 21, the sterilization space 31, and the cooling space 412 may be referred to as the carriage spaces, and the temperature raising housing 22, the sterilization housing 32, and the cooling housing 42 may be referred to as the carriage housings 12.

In this way, the carriage treating modules 10 may be provided while being separated from each other such that the carriage "C" itself may be moved between the modules, and through this, the sterilizer 1 may be easily maintained and repaired and the carriage treating modules 10 may be separated to be replaced or repaired when an important repair is necessary.

Furthermore, even though equipment of a specific carriage treating module 10 breaks down and a defect is caused in the product, a problem may be caused only in the corresponding carriage treating module 10 and the product located in the corresponding carriage treating module 10, and thus the number of wasted products may be minimized.

The carriage "C" that may enter the sterilizer, be treated, and be discharged is the carriage "C", in which the carriage "C" is loaded. A plurality of products, which are seated after foods to be treated are contained therein, may be loaded in the carriage "C", and the carriage "C" itself may enter the sterilizer 1 to be treated.

Opening/Closing Module 50

Figure 4:
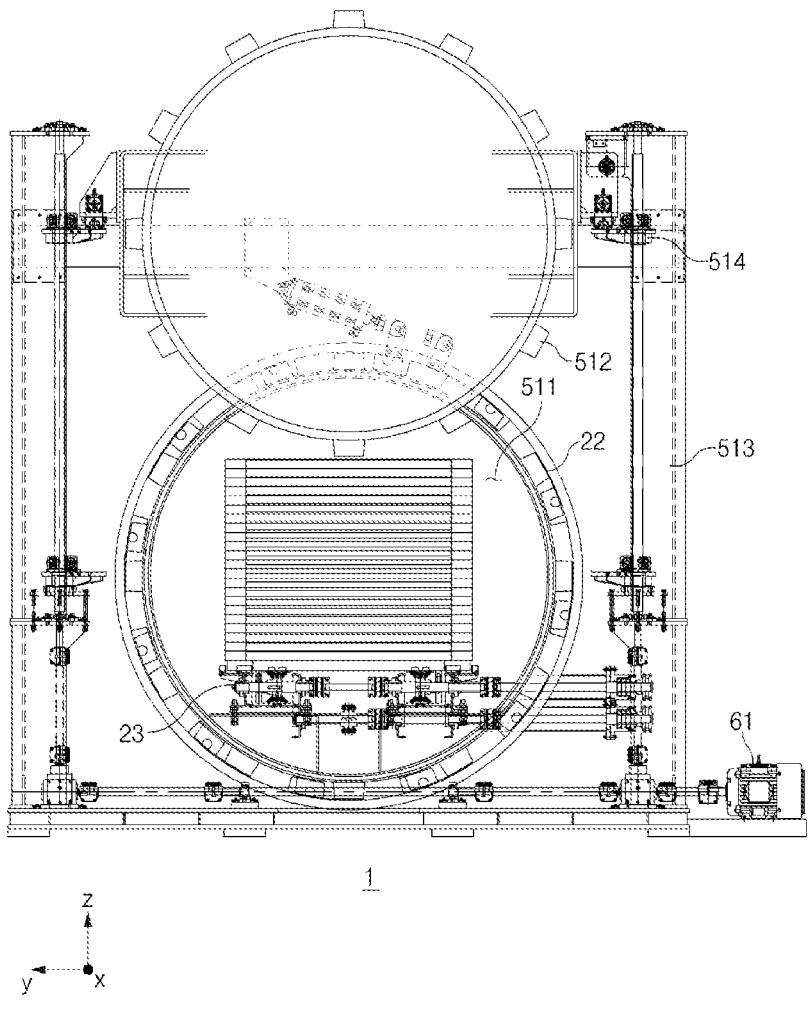
FIG. 4 is a front view in a state, in which an inlet door of a sterilizer is positioned at an inlet opening location, according to an embodiment of the present disclosure.

FIG. 4 is a front view in a state, in which an inlet door 512 of the sterilizer 1 is positioned at an inlet opening location, according to an embodiment of the present disclosure.

Referring to FIGS. 1 to 4, the sterilizer 1 according to an embodiment of the present disclosure may include the opening/closing module 50. The opening/closing module 50 may include an inlet door part 51 and an outlet door part 52 disposed at an inlet 511 of the sterilizer and an outlet 521 of the sterilizer, respectively. The inlet 511 of the sterilizer may be an inlet of the module located on the rearmost side, and the outlet 521 of the sterilizer may be an outlet of the module located on the foremost side.

In an embodiment of the present disclosure, because the inlet door part 51 is disposed on the rearmost side and the outlet door part 52 is disposed on the foremost side, the inlet door 512 is disposed at an inlet of the temperature raising module 20 that is the inlet 511 of the sterilizer, and an outlet door 522 is disposed at an outlet of the cooling module 40 that is the outlet 521 of the sterilizer. However, the kinds of the modules, to which the doors are connected, are not limited thereto, and may vary according to disposition of the modules.

In an embodiment of the present disclosure, the inlet door 512 may selectively open and close the inlet of the temperature raising module 20 that is the opening located on the rear side of the temperature raising space 21 and is the inlet 511 of the sterilizer such that the temperature raising space 21 and an outside of the temperature raising module 20 are communicated with each other. The outlet door 522 may selectively open and close the outlet of the cooling module 40 that is the opening located on the front side of the cooling space 41 and is the outlet 521 of the sterilizer such that the cooling space 41 and an outside of the cooling module 40 are communicated with each other.

Configurations of the inlet door 512 and the outlet door 522 are the same but only the locations thereof are different, and thus a description of the outlet door 522 will be replaced by describing the inlet door 512.

The inlet door 512 may be moved upwards and downwards to be disposed at the inlet closing location and the inlet opening location. The inlet closing location refers to a location, at which the inlet door 512 may close the inlet of the temperature raising module 20.

The inlet opening location refers to a location of the inlet door 512, at which the inlet door 512 may open the inlet of the temperature raising module 20, and in an embodiment of the present disclosure, refers to a location, at which the inlet door 512 deviates from the inlet closing location vertically upwards.

The opening/closing module 50 may include door supports 513 located on the left and right sides of the inlet door 512 such that the inlet door 512 may be moved how the inlet closing location to the inlet opening location. The door support 513 may be formed like a bar that stands up on a ground surface. Furthermore, the inlet door part 51 may include a door carriage 514 connected to the door support 513 to be slid, and connected to the inlet door 512. That is, when the door carriage 514 connected to the inlet door 512 is slid upwards and downwards along the door support 513, the inlet door 512 may be moved to the inlet closing location or the inlet opening location. The door carriage 514 may be a block that has a roller or a caster to be slid along a rail formed in the door support 513 or may be a block that is screw-coupled to a lead screw formed along the door support and may be moved along a vertical direction, but a driving scheme therefor is not limited thereto.

To transfer a driving force to the door carriage 514, the sterilizer 1 according to an embodiment of the present disclosure may further include an inlet driving device 61. The driving force generated by the inlet driving device 61 may be transferred to the door carriage 514 through a power transmission element, such as a chain, or may be transferred to the door support 513 that supports the door carriage 514 to move the inlet door 512. To move the outlet door 522, an outlet driving device 67 is applied, and only a location of the outlet driving device 67 is different but the outlet driving device 67 performs the same function.

As the inlet door 512 positioned at the inlet closing location is moved to the inlet opening location, the carriage "C", in which the product is loaded, may enter the sterilizer space 11 through the inlet of the temperature raising module 20. After the carriage "C" enters the sterilizer space 11, the inlet door 512 located at the inlet opening location may be moved to the inlet closing location to close the inlet of the temperature raising module 20.

The opening/closing module 50 may further include an inlet contact member that pushes the inlet door 512 toward the inlet of the temperature raising module 20 to make contact the inlet door 512 with the inlet of the temperature raising module 20 when the inlet door 512 is located at the inlet closing location for closing the inlet of the temperature raising module 20. The inlet contact member may be a hydraulic cylinder, to which the inlet door 512 and opposite ends of the door support 513 are connected, but the kind thereof is not limited thereto. The inlet contact member may press the inlet door 512 to a front side to make contact the inlet door 512 with the temperature raising housing 22 that defines the inlet of the temperature raising module 20, but a pressing direction thereof is not limited thereto.

The inlet door 512 may have a shape, a central area of which protrudes toward an outside. The inlet door 512 may have the shape, and a portion of the temperature raising housing 22 that surrounds the inlet of the temperature raising module 20 may be inserted into a concave inner side of the inlet door 512 such that a sealing state may be maintained well when the inlet door 512 is pressed by the inlet contact member after being moved to the inlet closing location.

The opening/closing module 50 may further include an inlet air-seal that is located on a surface of the inlet door 512, which faces the temperature raising module 20 when the inlet door 512 is located at the inlet closing location. The inlet air-seal may be expanded as air is injected thereinto to contact the temperature raising housing 22 of the temperature raising module 20 so as to maintain the sealing state of the temperature raising space 21. As the inlet air-seal is expanded by the introduced air, a space defined between the inlet of the temperature raising module 20 and the inlet door 512 may be effectively closed. The inlet air-seal may have an annular shape to correspond to the shape of the inlet of the temperature raising module 20.

Temperature Raising Module 20 and Cooling Module 40

The temperature raising module 20 and the cooling module 40 is element disposed on a rear side and a front side of the sterilization module 30 in an embodiment of the present disclosure. However, as described above, the dispositions and the numbers of the temperature raising modules 20 and the cooling modules 40 are not limited thereto.

The temperature raising module 20 may raise temperature and the cooling module 40 may perform a cooling operation. Accordingly, the heat treating device of the temperature raising module 20 may be a temperature raising/heat-treating device 26, and the heat treating device of the cooling module 40 may be a cooling/heat-treating device 46. The temperature raising/heat-treating device 26 may be a kind of a heat treating device that is directed to increasing the temperatures of the temperature raising space 21 and the carriage "C", in which the products located in the temperature raising space 21 are loaded, or allowing the temperatures to reach a specific temperature, and the cooling/heat-treating device 46 may be a kind of a heat treating device that performs an opposite function to that of the temperature raising/heat-treating device 26, of absorbing heat from the cooling space 41 and discharging the heat to the outside. Accordingly, a temperature of the product located in the carriage "C" that passes through the temperature raising module 20 may be increased, and a temperature of the product loaded in the carriage "C" that passed through the cooling module 40 may be decreased.

Media such as water for heat transfer may be filled in the temperature raising space 21 or the cooling space 41 of the temperature raising module 20 and the cooling module 40. Heated hot water may be filled in the temperature raising module 20, and cooled cold water may be filled in the cooling module 40. However, vapor instead of hot water may be used as the thermal medium in the temperature raising module 20, and refrigerant instead of cooling water may be used as the thermal medium in the cooling module 40.

Accordingly, the temperature raising/heat-treating device 26 or the cooling/heat-treating device 46 may include elements, such as a nozzle, a sprinkler, a showerhead, for filling water into a space in a scheme, such as ejection, and the temperature raising module 20 or the cooling module 40 may include an element, such as a valve, for discharging water filled in the temperature raising space 21 or the cooling space 41. However, the elements of the temperature raising/heat-treating device or the cooling/heat-treating device, which are provided to fill and discharge water, are not limited to the above-described elements, and may be other mechanical elements. An ejection hole of the nozzle may face a lower side, and the ejection hole may be formed to face another area of an inner wall thereof. Furthermore, the ejection holes may be formed to face the carriage on the left and right sides of the carriage "C".

The temperature raising module 20 or the cooling module 40 may further include a recirculation pipeline (not illustrated) to recirculate a thermal medium, such as water flowing up in the temperature raising space 21 or the cooling space 41. The recirculation pipeline may be configured such that one end thereof is connected to be adjacent to a lower end of the housing 12 and an opposite end thereof is connected to be adjacent to an upper end of the housing 12, and may include a pump that compresses the thermal medium to pump the thermal medium so as to receive water that flows up in the temperature raising space 21 or the cooling space 41 and eject the water from the corresponding space to the carriage "C" again. Furthermore, the opposite end of the recirculation pipeline may be connected to a heat treating device, and the heat treating device may eject the re-circulated thermal medium.

The temperature raising module 20 or the cooling module 40 may provide the air, a temperature of which has been changed via the rising thermal medium, to the temperature raising space 21 or the cooling space 41. An air providing valve (not illustrated) that provides air to the temperature raising space 21 or the cooling space 41 is connected to a lower side of the temperature raising space 21 or the cooling space 41 such that the air passes through the hot water or the cold water and is delivered to the temperature raising space 21 or the cooling space 41. Accordingly, because the air is heated by the hot water and is provided to the temperature raising space 21 or the air is cooled by the cooling water and is provided into the cooling space 41, the air may have a temperature that is different from that of the thermal medium filled in an interior of the carriage "C" when the air reaches the carriage "C" to prevent a situation, in which the products loaded in the carriage "C" are unevenly heated or cooled, and uniformly heat the products.

The temperature raising module 20 or the cooling module 40 may further include a vapor provider (not illustrated) on a lower side of the housing 12 to provide vapor to a thermal medium located on a lower side of the temperature raising space 21 or the cooling space 41. As the vapor is supplied to the thermal medium accommodated on the lower side of the temperature raising space 21 or the cooling space 41, a temperature of the thermal medium provided to the carriage "C" through the heat treating device and a temperature of the thermal medium accommodated to the temperature raising space 21 or the cooling space 41 may be adjusted to be similar to each other.

The temperature raising module 20 or the cooling module 40 may further include an exhaust valve (not illustrated) that releases pressure to prevent the temperature raising space 21 or the cooling space 41 from excessively rising to a high pressure and maintain the pressure at a proper pressure level such that the exhaust valve passes through the housing 12. An internal pressure may be controlled by opening and closing the exhaust valve, and may be adjusted to the proper pressure level when the internal pressure becomes abnormal.

The temperature raising module 20 and the cooling module 40 may further include the movement part 13 for moving the carriage "C" that enters the temperature raising space 21 and the cooling space 41. The movement part 13 may move the carriage "C" at least horn the temperature raising space 21 to the cooling space 41 via the sterilization space 31.

The movement part 13 may include a heating movement part 23 disposed in the temperature raising space 21, the sterilization movement part 33 disposed in the sterilization space 31, and a cooling movement part 43 disposed in the cooling space 41.

The heating movement part 23, the sterilization movement part 33, and the cooling movement part 43 may be divided by intermediate door parts 53, which will be described below, and may be spaced apart from each other forwards and rearwards. The sterilization movement part 33 may include the sterilization movement part 33 and the carriage seating part 353, such that they may be spaced apart from each other forwards and rearwards. The sterilization movement part 33 in turn may include a first connection unit 331 and a second connection unit 332 such that they are spaced apart from each other forwards and rearwards with respect to the carriage seating part 353.

Because the movement parts 13 thereof are spaced apart from each other forwards and rearwards, areas, in which the carriage "C" is not supported, are formed between the movement parts 13. An interval between the movement parts 13 of the sterilizer 1 according to an embodiment of the present disclosure may be smaller than a forward/rearward width of the carriage "C". Preferably, a distance, by which the plurality of wheels included in the carriage "C" are spaced apart from each other, may be smaller than the interval between the movement parts 13 such that a palette of the carriage "C", in which the products are loaded, is moved forwards. Because the interval between the movement parts 13 is determined in this way, a situation, in which the wheels of the carriage "C" are inserted into the spaces between the movement parts 13 such that the carriage "C" cannot be moved, may be prevented.

Each of the movement parts 13 may include movement rollers that are rotated while a rotational direction thereof is taken as an axial direction thereof. In detail, each of the movement parts 13 may include a plurality of movement rollers, and a movement belt that surrounds the plurality of movement rollers and is rotated as the movement rollers are rotated. Accordingly, the belt that is moved forwards as the movement rollers are rotated may move the carriage "C" seated on the movement belt forwards. However, configurations of the movement part 13 are not limited thereto.

To drive the movement rollers, the sterilizer 1 according to an embodiment of the present disclosure may further include a movement driving device. The movement driving device may be disposed on an outside of the housing 12, and may generate a driving force and may transfer the driving force to the movement part 13 through another element. The movement driving device may include a heating movement part driving device 62 that generates a driving force for the heating movement part 23, a cooling movement part driving device 66 that generates a driving force for the cooling movement part 43, and a first connection driving device 63 and a second connection driving device 65, which will be described below.

To transmit the driving force generated by the movement driving device, a movement transferring unit 70 is disposed. The movement transferring unit 70 is an element that passes through the housing 12 to transfer the driving force from the movement driving device to the movement part 13 as the movement part 13 is disposed in an interior of the housing 12. The movement transferring unit 70 may include one or more shaft members, gears, and a belt or a chain that connects the gears.

In an embodiment of the present disclosure, the carriage "C" that entered the temperature raising space 21 may be transferred to the heating movement part 23 that is a kind of the movement part 13, and may be disposed at a specific location in the temperature raising space 21 by an operation of the heating movement part 23 including a temperature raising rollers 231 that are a kind of movement rollers and a temperature raising belt 232 that is a kind of a movement belt, in a state, in which the carriage "C" is seated on the heating movement part 23. A temperature raising/transfer unit 70 that is a kind of the movement transferring unit 70 may transfer the driving force of the heating movement part driving device 62 to the heating movement part 23. The temperatures of the products loaded in the carriage "C" are raised by the temperature raising/heat-treating device 26 included in the temperature raising module 20. The temperatures of the products may be raised to a sterilization temperature that is a predetermined temperature for carrying out sterilization. After the temperatures of the products are raised, an intermediate door 533*a* of a rear intermediate door part 53*a* that is an intermediate door part 53 located on a rear side of the sterilizer may be moved from the closing location to the opening location. The heating movement part 23 may be operated such that the carriage "C" enters the sterilization space 31 from the temperature raising space 21.

The carriage "C", in which the products treated by the sterilization module 30 have been treated, and which will be described below, is discharged to the cooling space 41. An intermediate door 533*b* of a front intermediate door part 53*b* may be moved from the closing location to the opening location, and the carriage "C" may be disposed from the sterilization space 31 by an operation of the second connection unit 332 and enter the cooling space 41.

The products loaded in the carriage "C" that entered the cooling space 41 are cooled by the cooling/heat-treating device 46 of the cooling module 40. After the cooling operation is finished, the outlet door may be moved from the door closing location to the door opening location, and the carriage "C" may be discharged to an outside of the sterilizer 1 by an operation of the cooling movement part 43. The cooling/heat-treating device 46 may receive the carriage "C" from the sterilization module 30 in a state, in which a temperature of the cooling space 41 is adjusted to a sterilization temperature that is a temperature used for sterilization in the sterilization module 30, to prevent damage to the products due to an abrupt temperature difference when the carriage "C" is transferred to the cooling module 40.

Sterilization Module 30

Figure 5:
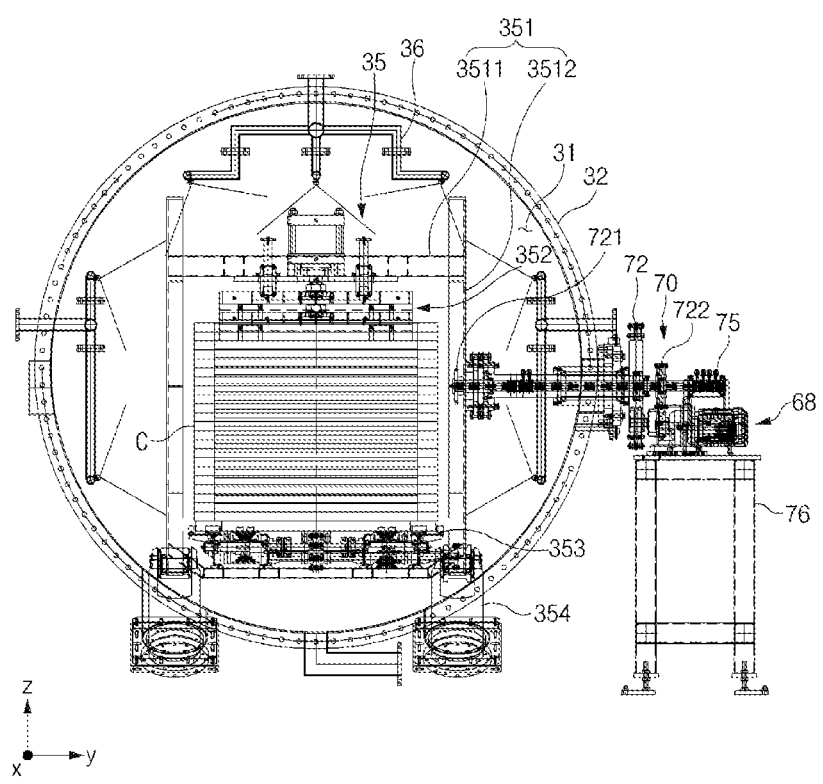
FIG. 5 is a cross-sectional view obtained by cutting a sterilization module by a plane that is perpendicular to an entrance direction, in a situation, in which a carriage reaches a rotation part of a sterilizer, according to an embodiment of the present disclosure.
Figure 6:
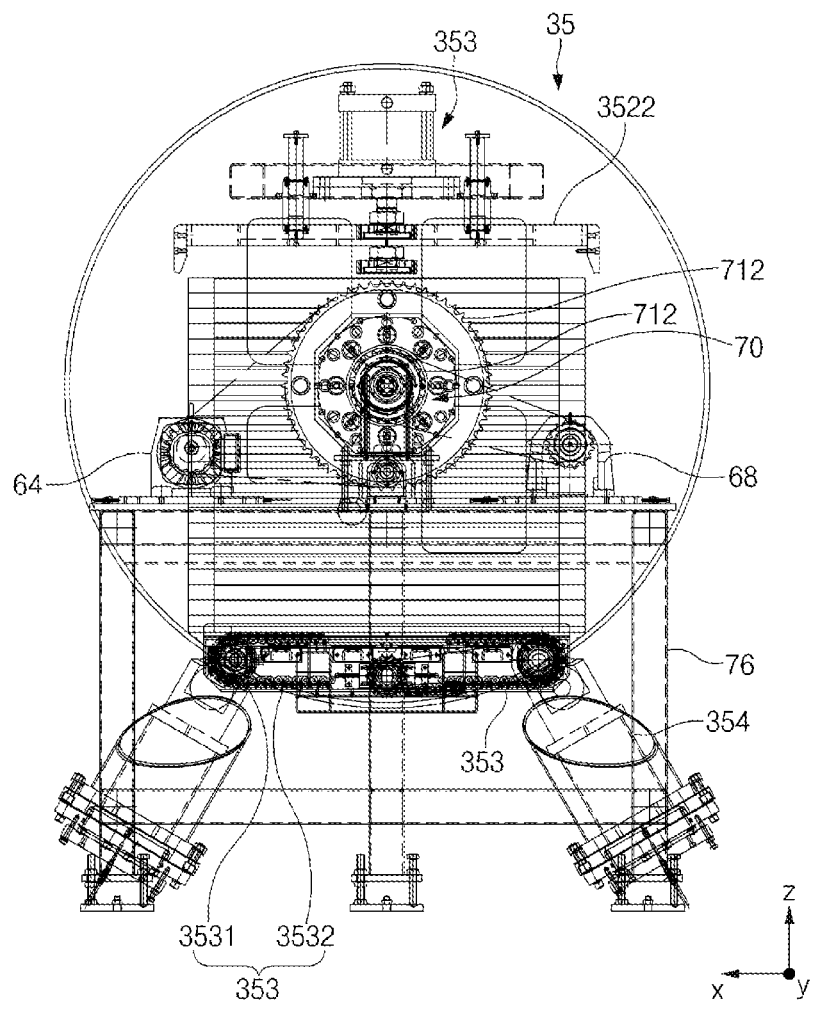
FIG. 6 is a view illustrating a rotation part of a sterilizer along a rotational direction thereof according to an embodiment of the present disclosure.
Figure 7:
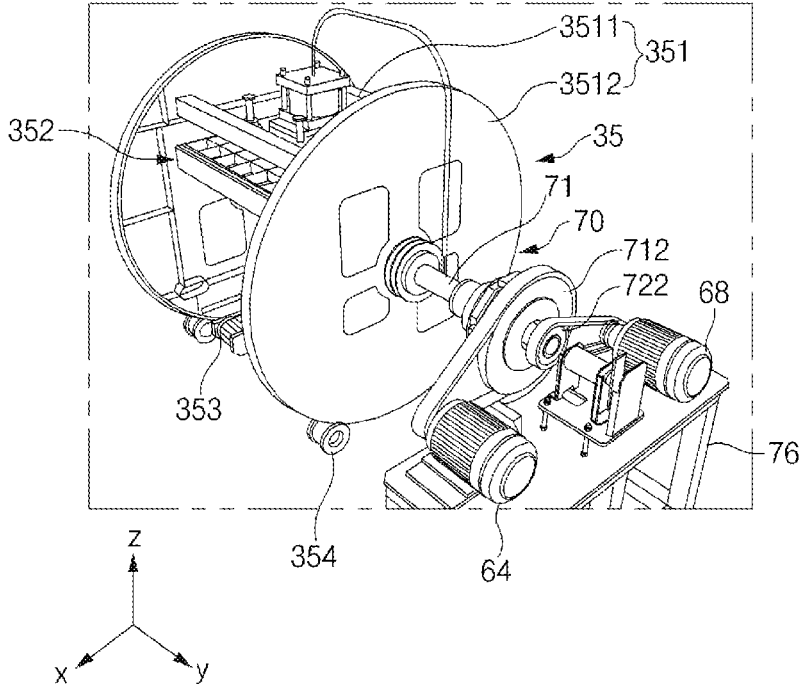
FIG. 7 is a perspective view conceptually illustrating a structure of a rotation part of a sterilizer according to an embodiment of the present disclosure.
Figure 8:
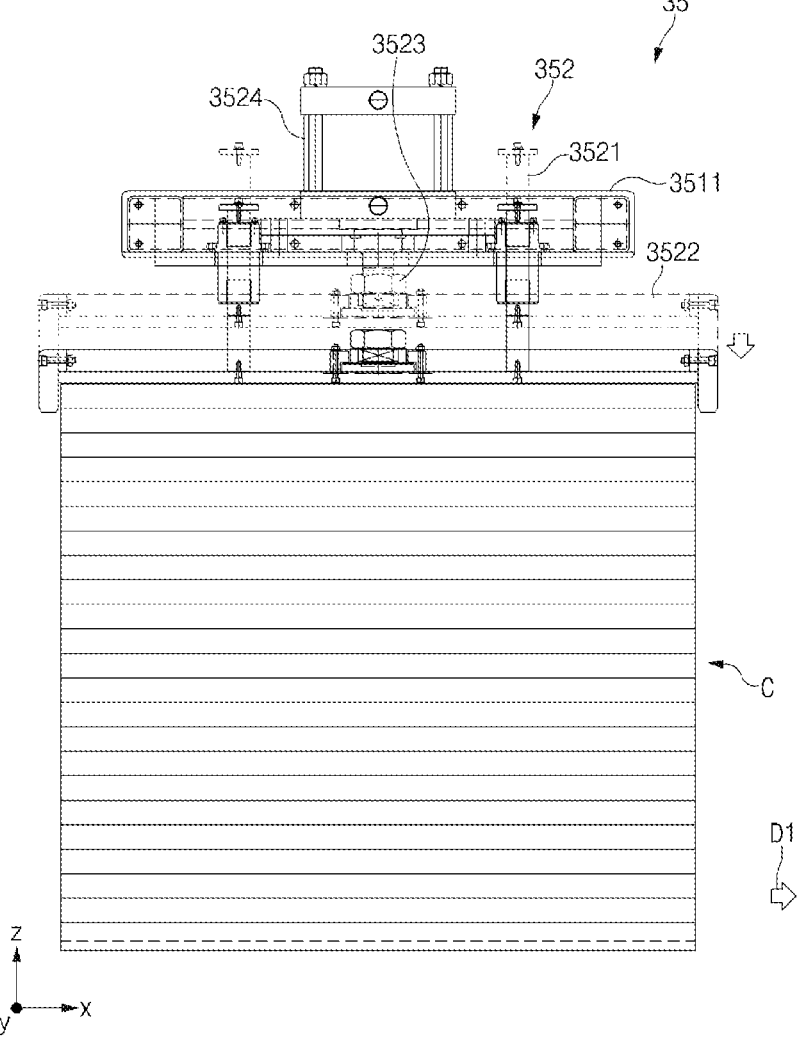
FIG. 8 is a view illustrating an operation of applying a pressure such that a gripper pusher of a sterilizer grips a carriage according to an embodiment of the present disclosure.

FIG. 5 is a cross-sectional view obtained by cutting the sterilization module 30 by a plane that is perpendicular to the entrance direction D1, in a situation, in which the carriage "C" reaches a rotation part 35 of the sterilizer 1, according to an embodiment of the present disclosure. FIG. 6 is a view illustrating the rotation part 35 of the sterilizer 1 along a rotational direction thereof according to an embodiment of the present disclosure. FIG. 7 is a perspective view conceptually illustrating a structure of the rotation part 35 of the sterilizer 1 according to an embodiment of the present disclosure. FIG. 8 is a view illustrating an operation of applying a pressure such that a gripper pusher 3522 of the sterilizer 1 grips the carriage "C" according to an embodiment of the present disclosure.

Referring to FIGS. 1 to 8, the carriage "C" that entered the sterilization space 31 is transferred to the carriage seating part 353 located on an upstream side of the carriage seating part 353 with respect to the entrance direction D1. The above-described shape and driving scheme of the movement part 13 may be applied to the shapes and driving schemes of the second connection unit 332 and the carriage seating part 353 located on the downstream sides of the first connection unit 331 and the carriage seating part 353, but because the carriage seating part 353 and a connection scheme of a seating driving device 68 that transfers the driving force thereto are slightly different, the description thereof will be replaced by the existing description and only the differences will be described below in a description of FIG. 10.

The driving force that is necessary for an operation of the first connection unit 331 may be provided by the first connection driving device 63 included by the movement driving device, and the driving force that is necessary for an operation of the second connection unit 332 may be provided by the second connection driving device 65 included by the movement driving device. The first connection transfer unit 70 and the second connection transfer unit 70 that pass through the housing 12, and connect the first connection unit 331 and the second connection unit 332 to the first connection driving device 63 and the second connection driving device 65, respectively, may transfer the driving force to the first connection unit 331 and the second connection unit 332.

The first connection unit 331 and the second connection unit 332 are located on an outside of a contour drawn when a rotation part frame 351 is rotated. That is, the first connection unit 331 and the second connection unit 332 are disposed at locations that do not interfere rotation of the rotation part frame 351. Contours of perfect circles drawn when the rotation part frame 351 is rotated are illustrated the drawings obtained by viewing the sterilizer 1 along a rotational direction. Accordingly, the rotation part 35 may rotate the carriage "C" without any collision due to interferences.

The carriage "C" may reach the rotation part 35 due to an operation of the first connection unit 331. The rotation part 35 is an element that grips the carriage "C" and rotates the carriage "C" about a rotation axis of the carriage "C", which is parallel to the rotational direction, and may include the rotation part frame 351, a rotation gripping part 352, and the carriage seating part 353.

The rotation part frame 351 is an element that rotates the gripped carriage "C" about the same direction by rotating the carriage "C" about the rotation axis. The rotation part frame 351 may rotate the carriage "C" such that the thermal medium is uniformly ejected to the carriage "C". The rotation part frame 351 may include a frame horizontal-member 3511 manufactured by connecting members that extend in left/right directions and forward/rearward directions that are parallel to a horizontal surface, and a frame vertical-member 3512 that extend along the upward/downward directions, and may constitute a rectangular parallelepiped frame, into which the carriage "C" may be introduced forwards. However, a shape of the rotation part frame 351 is not limited thereto.

Because the rotation part frame 351 constitutes the frame of the rotation part 35, the rotation gripping part 352 and the carriage seating part 353 are connected to the rotation part frame 351 and the transfer unit 70, which will be described, also are connected to the rotation part frame 351 such that the rotation part frame 351 is rotated about the rotation axis of the carriage.

The rotation gripping part 352 is an element that approaches the carriage "C" to grip the carriage "C" that entered the rotation part 35 or is spaced apart from the carriage "C". The rotation gripping part 352 is connected to an upper side of the rotation part frame 351 at a basic location, at which the carriage seating part 353 is disposed to be parallel to the entrance direction D1.

The rotation gripping part 352 is supplied with a working fluid, and is operated by a pressure thereof. The working fluid may be oil or air, and thus the rotation gripping part 352 may be operated by a hydraulic pressure or a pneumatic pressure. To supply the working fluid to the rotation gripping part 352, the transfer unit 70 may include a working fluid delivering element 73. The working fluid delivering element 73 and the rotation gripping part 352 are connected to each other through a gripper line (not illustrated) whereby the working fluid fed from the outside of the housing 12 into the housing 12 by the working fluid delivering element 73 may be provided to the rotation gripping part 352 through the gripper line. A detailed description of the working fluid delivering element 73 will be made in the description of FIG. 10.

The rotation gripping part 352 is configured to approach the carriage "C" to grip the carriage "C" that entered the rotation part frame 351 when receiving the working fluid, and to be spaced apart from the carriage "C" to release the gripping of the carriage "C" when discharging the working fluid.

In detail, the rotation gripping part 352 may include the gripper pusher 3522 that employs a scheme of pressing the carriage "C" for gripping. However, the rotation gripping part 352 may further include a member that grips the carriage "C" or performs a portion of a process of gripping the carriage "C" like a member that is coupled to a portion of the carriage "C" to fix a relative location of the carriage "C" with respect to the entire rotation part 35.

The gripper pusher 3522 is moved downwards toward the carriage "C" when the working fluid is supplied. The moved gripper pusher 3522 presses the carriage "C" downwards to grip the carriage "C". The gripper pusher 3522 may have a shape that may cover an upper end of the carriage "C" to restrain the carriage "C" from deviating from the gripper pusher 3522 when the carriage "C" is pressed. Accordingly, the gripper pusher 3522, as illustrated in FIGS. 6 and 8, may have a "U" shape that is opened toward a lower side when being cut by a plane that is perpendicular to the rotational direction. In other words, the gripper pusher 3522 may have an inverse "U" shape or an arch shape.

The rotation gripping part 352 may include a pusher cylinder 3524 that linearly moves the gripper pusher 3522 along a vertical direction such that the gripper pusher 3522 moves downwards to press the carriage "C". When the working fluid is supplied to the pusher cylinder 3524, the pusher cylinder 3524 may be expanded to move the gripper pusher 3522 downwards, and when the working fluid is discharged from the pusher cylinder 3524, the pusher cylinder 3524 may be contracted to move the gripper pusher 3522 upwards.

The rotation gripping part 352 may further include at least one pusher guide 3521 which is coupled to the frame horizontal-member 3511 included in the gripper frame to be slid, and a lower end of which is coupled to the gripper pusher 3522 whereby the gripper pusher 3522 is linearly moved without being shaken, is seated in the carriage "C", and presses the carriage "C" downwards. The gripper pusher 3522 may be supported against the gripper frame at a location, at which the plurality of pusher guides 3521 are spaced apart from each other. The pusher guide 3521 may be inserted into a through-hole formed in the gripper frame to be slid downwards when the pusher cylinder 3524 is expanded, and to be slid upwards when the pusher cylinder 3524 is contracted.

The rotation gripping part 352 may further include an auxiliary pusher 3523 that further presses an upper surface of the carriage "C" to effectively grip the carriage "C". The auxiliary pusher 3523 may be located at a center of the gripper pusher 3522.

A location is indicated by a broken line in FIG. 8 when the gripper pusher 3522 is located at a basic location, and a location when the gripper pusher 3522 is moved downwards to press the carriage "C" is indicated by a solid line.

The carriage seating part 353 included in the rotation part 35 is an element that is installed in the rotation part frame 351 and is configured such that the carriage "C" is seated thereon. The carriage seating part 353 is a kind of the movement part 13 like the one described above, and may include seating rollers 3531 and a seating belt 3532 similar to the above-described contents and may receive the driving force generated by the seating driving device 68 located on an outside of the housing 12 through a seating transfer member 72 included in the transfer unit 70 to be operated. The carriage seating part 353 may be rotated such that a partial force for the carriage "C" is generated from an upper surface thereof to a front side to move the carriage "C" seated on the upper surface forwards.

Because the carriage "C" is seated on the carriage seating part 353, the carriage seating part 353 may support the carriage "C" when the gripper pusher 3522 presses the carriage "C", and consequentially, may function to press the carriage "C" together with the gripper pusher 3522 to grip the carriage "C". The carriage "C" may be supported by the carriage seating part 353 from a lower side, and be supported by the gripper pusher 3522 from an upper side to sandwich the carriage "C" therebetween.

The carriage seating part 353 may act as a resistance to movement of the carriage "C", and may be controlled not to be compulsorily rotated while the rotation part frame 351 is rotated so as to restrain movement of the carriage "C" with respect to the carriage seating part 353 while the rotation part frame 351 is rotated. The carriage seating part 353 may be maintained in a stopped state, or may generate a resistance to rotation of the carriage "C", which is generated in any direction due to the self-weight of the carriage "C". To maintain the stopped state or generate the resistance, a brake that hinders movement of the seating rollers 3531 or the seating belt 3532 may be further disposed in the carriage seating part 353, and may be operated or stopped such that the seating driving device 68 generates a partial force in an opposite direction to a direction, in which rotation is generated, to achieve the object.

Because the carriage seating part 353 may act as a resistance to movement of the carriage "C", the carriage "C" may be prevented from being slid or deviating from the carriage seating part 353 while being rotated in the same direction as that of the rotation part frame 351 when the rotation part frame 351 is rotated.

Figure 9:
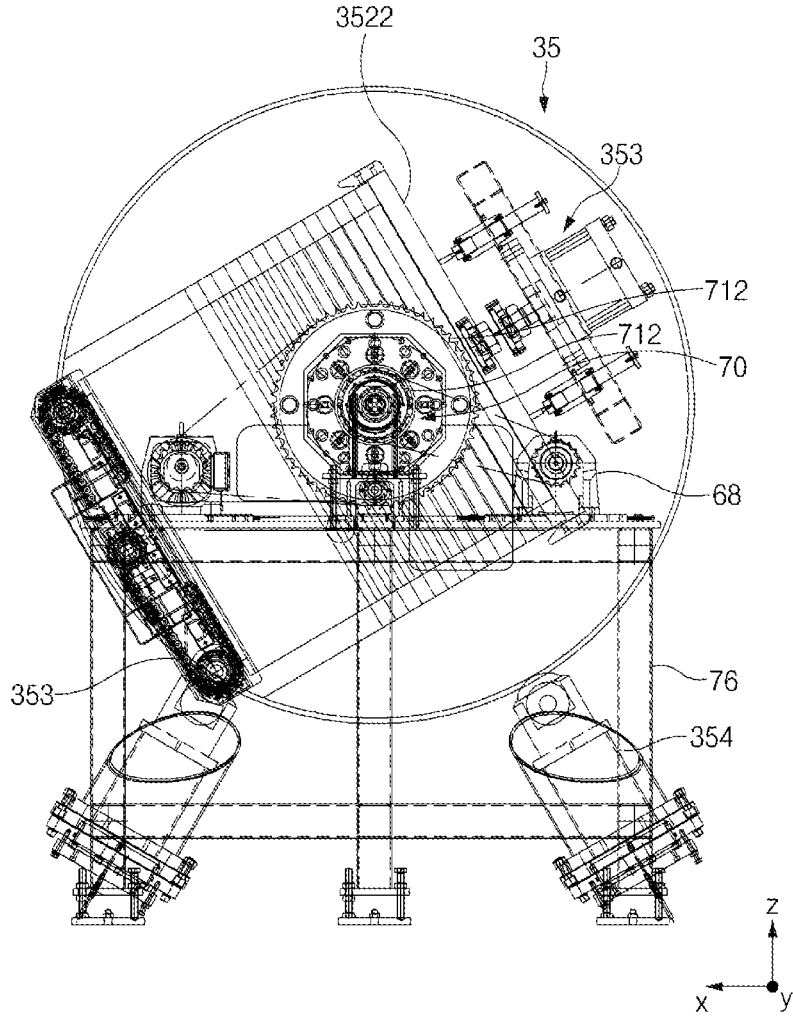
FIG. 9 is a view illustrating a situation, in which a carriage is rotated by rotating a rotation part frame of a sterilizer according to an embodiment of the present disclosure.

FIG. 9 is a view illustrating a situation, in which the carriage "C" is rotated by rotating the rotation part frame 351 of the sterilizer 1 according to an embodiment of the present disclosure.

The carriage "C" may be gripped well by the above-described operation of the carriage seating part 353 and the rotation gripping part 352, and a relative location thereof with respect to the rotation part frame 351 may be fixed even while the rotation part frame 351 is rotated.

In a state, in which the carriage "C" is gripped by the rotation gripping part 352, the rotation part frame 351 may receive the driving force generated by a rotation driving device 64 through the transfer unit 70, and may be rotated about the rotation axis of the carriage "C". The rotation driving device 64 is located on an outside of the housing 12, and functions to generate the driving force for rotating the rotation part frame 351. The rotation part frame 351 may be rotated by 360 degrees, and may perform a swing operation of being rotated from a basic location in one direction by a specific angle and then being rotated from the basic location to an opposite direction to go to a location, at which it is rotated by the specific angle.

The rotation part 35 may further include a rotation support part 354. The rotation support part 354 is an element that supports rotation of the rotation part frame 351 that is rotated about a rotational direction thereof. The rotation support part 354 may pass through a lower end of the sterilization housing 32 but may not be seated on a ground surface. The rotation support part 354 may include a rolling member that may be rolled about the rotational direction, at an upper end thereof, which entered the sterilization space 31, and the rolling member may contact the rotation part frame 351. When the rotation part frame 351 is rotated, the rolling member that contacts the rotation part frame 351 is rotated, whereby the rotation support part 354 may support a load of the rotation part frame 351 and guide rotation of the rotation part frame 351.

A plurality of rotation support parts 354 may be provided, and may be disposed at locations that are symmetrical to each other with respect to the rotation part frame 351 such that the rotation part frame 351 is supported in a balanced way. In the drawings of an embodiment of the present disclosure, it has been described that a total of four rotation support parts 354 are spaced apart from each other along the entrance direction D1 and the rotational direction and are disposed to be symmetrical to each other with respect to the rotation part frame 351, but the disposition thereof is not limited thereto.

The rotation part frame 351 may be rotated about the rotational direction, and a sterilization/heat-treating device 36 that is the heat treating device included in the sterilization module 30 may carry out a heat treatment at a sterilization temperature of a predetermined temperature. The sterilization/heat-treating device 36 may provide the thermal medium to the sterilization space 31 for the heat treatment. As the thermal medium is provided, the products loaded in the carriage "C" may be sterilized. The sterilization/heat-treating device 36 may be disposed on an upper side of an inner surface of the sterilization housing 32, but a location thereof is not limited thereto. The thermal medium may be hot water that is heated water, but other thermal media may be used.

Because the carriage "C" is heat-treated by applying the thermal medium while being rotated, the products loaded in the carriage "C" may be heat-treated more uniformly as compared with a case, in which the carriage "C" is heat-treated while the carriage "C" is stopped.

The sterilization/heat-treating device 36 that provides the thermal medium to the sterilization space 31 is a kind of a heat treating device. Accordingly, because the sterilization/heat-treating device 36 may have configurations that are the same as or similar to those of the temperature raising/heat-treating device 26 and the cooling/heat-treating device 46, which have been described above, the sterilization module 30 may have a recirculation pipeline, an air providing device, a vapor providing device, and an exhaust valve, together with another carriage treating module 10, in the same way. Accordingly, in a description of the sterilization/heat-treating device 36 of the sterilization module 30, only a difference from the carriage treating module 10 will be described.

The sterilization/heat-treating device 36 may include a container having a punched plate having a plurality of fine holes. The thermal medium may be embedded in the container, and the embedded thermal medium may be ejected to an outside through the holes of the punched plate to heat-treat the products loaded in the carriage "C".

As the rotation part frame 351 is rotated, the elements connected to the rotation part frame 351 also are rotated together. Accordingly, the rotation gripping part 352 and the carriage seating part 353 that grip the carriage "C" are rotated together.

After the heat treatment of the products loaded in the carriage "C" is finished, the rotation and the heat treatment are ended. First, the rotation part frame 351 returns to the basic location that is a location at which the carriage seating part 353 and the sterilization movement part 33 are arranged in parallel to each other. As the working fluid is discharged from the rotation gripping part 352, the pressure is reduced, and the gripper pusher 3522 deviates from the carriage "C" upwards to release the gripping.

Thereafter, the carriage seating part 353 may be operated to feed the carriage "C" to the second connection unit 332, and the second connection unit 332 may be operated to feed the carriage "C" to the cooling module 40 that is the next carriage treating module 10. When one of the intermediate door 533*a* of the intermediate door part 53, which is located downstream side, is disposed at the closing location to block the carriage "C", the intermediate door 533*a* on the downstream side is moved to the opening location in a state, in which the operation of the second connection unit 332 is stopped, to open the intermediate opening such that a state, in which the carriage "C" may be discharged from the sterilization space 31, is created, and then the second connection unit 332 may be operated to feed the carriage "C" to the cooling module 40.

Meanwhile, the rotation part frame 351 is rotated about the rotation axis of the carriage "C" that is parallel to the leftward/rightward directions, and has a perpendicular relationship with the entrance direction D1 that is a direction, in which the carriage "C" enters the rotation part frame 351. Accordingly, because a rotation transfer member 71 and the like, which are provided to rotate the rotation part frame 351, may be arranged along the leftward/rightward directions and may not be parallel to the entrance direction D1, the entire sterilizer 1 may shorten a length along the entrance direction D1.

Transfer Unit 70

Figure 10:
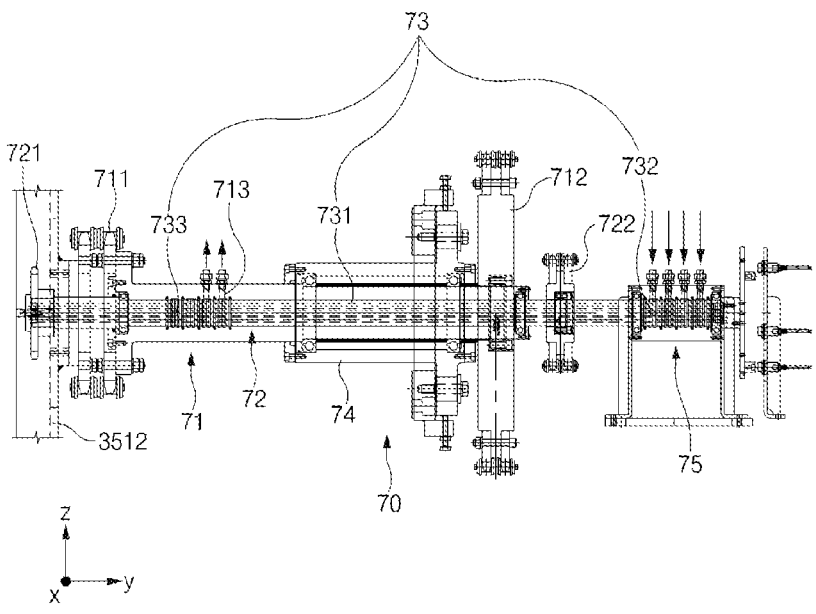
FIG. 10 is a cross-sectional view obtained by cutting, a transfer unit of a sterilizer by a plane that is perpendicular to an entrance direction according to an embodiment of the present disclosure.
Figure 11:
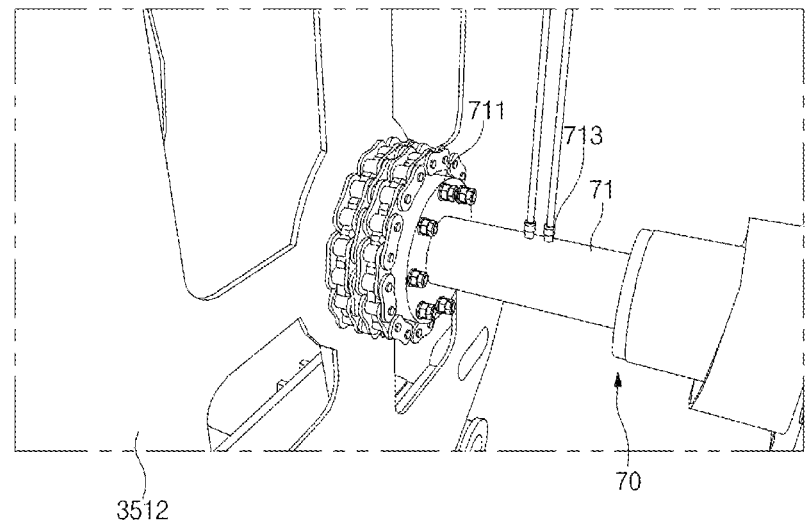
FIG. 11 is an enlarged view conceptually illustrating a form, in which a transfer unit of a sterilizer is connected to a rotation part frame, according to an embodiment of the present disclosure.
Figure 12:
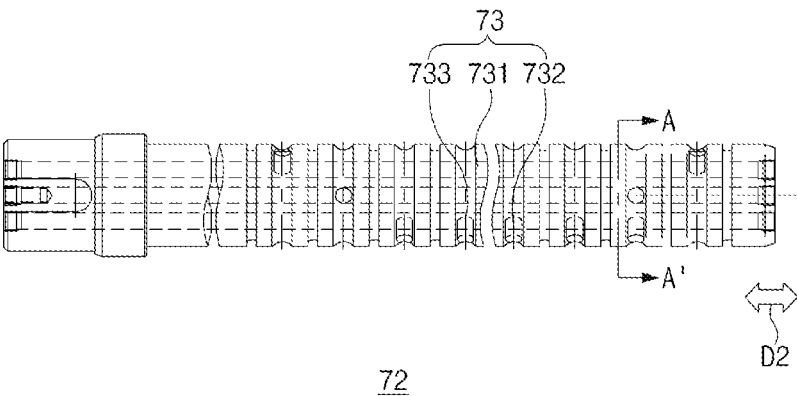
FIG. 12 is a view illustrating a seating transfer member of a sterilizer according to an embodiment of the present disclosure.
Figure 13:
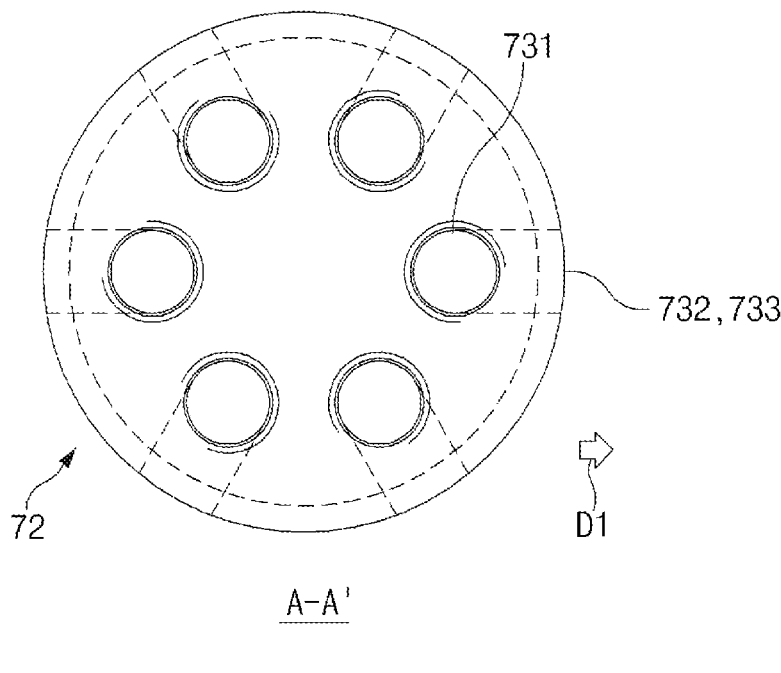
FIG. 13 is a cross-sectional view obtained by cutting a seating transfer member of a sterilizer by a plane that is perpendicular to a rotational direction according to an embodiment of the present disclosure.
Figure 14:
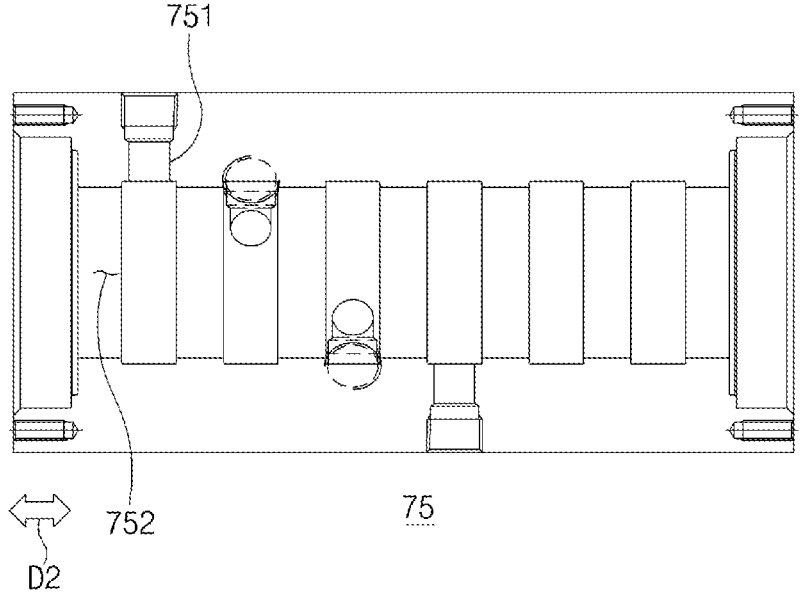
FIG. 14 is a cross-sectional view obtained by cutting a transfer member holder of a sterilizer by a plane that is perpendicular to an entrance direction according to an embodiment of the present disclosure.
Figure 15:
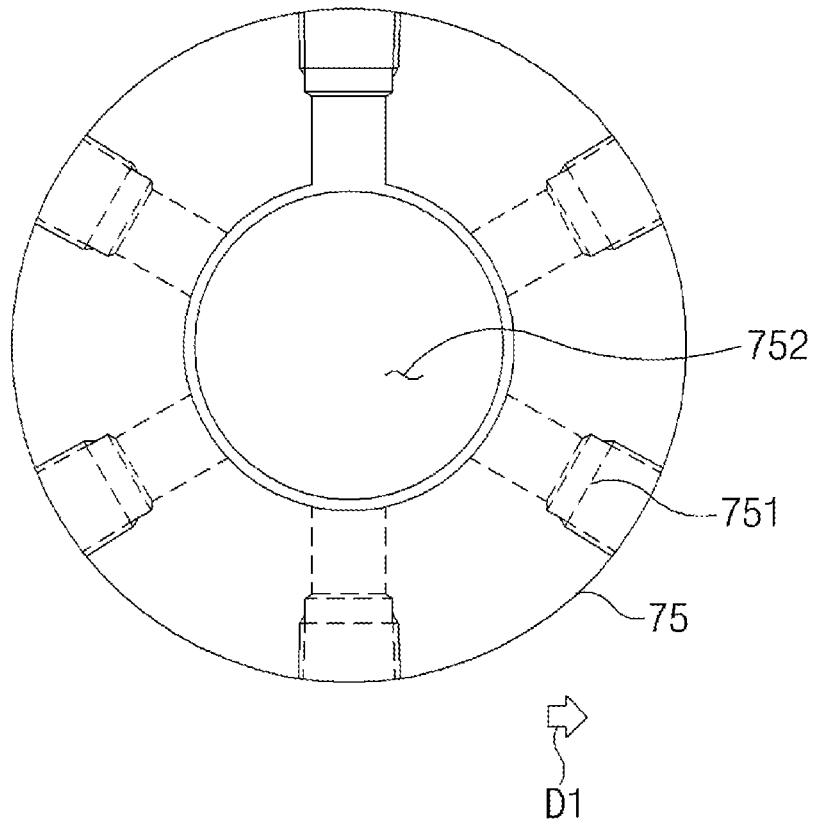
FIG. 15 is a cross-sectional view obtained by cutting a transfer member holder of a sterilizer by a plane that is perpendicular to a rotational direction according to an embodiment of the present disclosure.

FIG. 10 is a cross-sectional view obtained by cutting the transfer unit 70 of the sterilizer 1 by a plane that is perpendicular to the entrance direction D1 according to an embodiment of the present disclosure. FIG. 11 is an enlarged view conceptually illustrating a form, in which the transfer unit 70 of the sterilizer 1 is connected to the rotation part frame 351, according to an embodiment of the present disclosure. FIG. 12 is a view illustrating the seating transfer member 72 of the sterilizer 1 according to an embodiment of the present disclosure. FIG. 13 illustrates cross-section A-A' of FIG. 12, and is a cross-sectional view obtained by cutting the seating transfer member 72 of the sterilizer 1 by a plane that is perpendicular to a rotational direction according to an embodiment of the present disclosure. FIG. 14 is a cross-sectional view obtained by cutting a transfer member holder 75 of the sterilizer 1 by a plane that is perpendicular to the entrance direction D1 according to an embodiment of the present disclosure. FIG. 15 is a cross-sectional view obtained by cutting the transfer member holder 75 of the sterilizer 1 by a plane that is perpendicular to a rotational direction according to an embodiment of the present disclosure.

To grip the carriage "C" while the rotation part frame 351 is rotating, a pressure of the working fluid applied to the gripper pusher 3522 has to be maintained, and the carriage seating part 353 has to apply a resistance to the movement of the carriage "C" to the carriage "C". A power transmitting structure that may be rotated relatively is suggested in a form of the transfer unit 70 according to an embodiment of the present disclosure such that the elements may be operated while the connected members are not twisted during the rotation.

The transfer unit 70 is a power transmitting structure of the sterilization module 30. The transfer unit 70 passes through the sterilization housing 32 to transfer the working fluid or the power from the outside of the sterilization housing 32 to an interior of the housing 12. To minimize a size of the sterilizer space 11 in the interior of the housing 12 and to dispose only a minimum number of elements the sterilizer space 11 that performs heat treatment, the element that generates the driving force is disposed on an outside of the housing 12 and the transfer unit 70 passes through the housing 12.

The transfer unit 70 includes the working fluid delivering element 73 that delivers the working fluid to the rotation gripping part 352, and a rotation transferring member 71 that transfers the driving force to the rotation driving device 64. The working fluid delivering element 73 and the rotation transferring member 71 are disposed such that any one of them surrounds the other and they are rotated relatively. It is illustrated in an embodiment of the present disclosure that the rotation transferring member 71 is formed in a form of multiple pipelines disposed on the outermost side, in a form, in which the rotation transferring member 71 surrounds the working fluid delivering element 73, but the disposition of the working fluid delivering element 73 and the rotation transferring member 71 is not limited thereto.

The rotation transferring member 71 may be formed in a form of a pipe, a center of which is opened. An outer rotation adapter 712 may be coupled to an area that is adjacent to an end of the rotation transferring member 71 located on an outside of the housing 12. The outer rotation adapter 712 may be formed in a form of a disk or a saw-tooth, and a belt connected to a driving shaft of the rotation driving device 64 may be wound on an outer peripheral surface of the outer rotation adapter 712 such that the outer rotation adapter 712 may receive the driving force of the rotation driving device 64. As the outer rotation adapter 712 is rotated, the rotation transferring member 71 may be rotated about the rotation axis of the carriage "C".

An end of the rotation transferring member 71, which is located in the interior of the housing 12, may be coupled to the rotation part frame 351. Accordingly, as the rotation transferring member 71 is rotated about the rotation axis of the carriage "C", the rotation part frame 351 is rotated. That is, the driving force of the rotation driving device 64 is transferred to the rotation part frame 351, through the rotation transferring member 71, to rotate the rotation part frame 351.

An inner rotation adapter 711 may be coupled to an area that is adjacent to an end of the rotation transferring member 71 located on an inside of the housing 12. The inner rotation adapter 711 is also formed in a form of a disk or a saw-tooth, and a belt for rotating the rotation part frame 351 and the like are coupled to an outer peripheral surface of the inner rotation adapter 711 to rotate the rotation part frame 351.

The transfer unit 70 may further include the seating transfer members 72 that pass through the sterilization housing 32 and transfer the driving force generated by the seating driving device 68 to the seating rollers 3531. The seating transfer members 72 may extend leftwards and rightwards, and may be surrounded by the rotation transferring member 71 and may be disposed to be rotated relatively. Although it has been described in an embodiment of the present disclosure that the seating transfer members 72 are inserted into a hollow formed at a center of the rotation transferring member 71 and are rotated relatively, the disposition of the rotation transferring member 71 and the seating transfer member 72 is not limited thereto.

The outer surface of the seating transfer member 72, as illustrated, may have a shape, in which protrusions having an annular shape and grooves that are concaved in a radially inner side than the protrusions are alternately formed, as it goes to the left and right sides, in a partial area thereof. The convexo-concave areas may be located at a portion of the seating transfer member 72, which is located on an inside of the housing 12, and at a portion of the seating transfer member 72, which is located on an outside of the housing 12. Due to the shape, even when being connected to the housing 12 to be rotated, the seating transfer member 72 may be moved to the inside of the housing 12 or may not be moved to the outside of the housing 12 to maintain a relative location in relationship with the housing 12, according to the rotational direction.

An outer seating adapter 722 may be coupled to an end of the seating transfer member 72, which is located on an outside of the housing 12. The outer seating adapter 722 may be formed in a form of a disk, and a belt connected to a driving shaft of the seating driving device 68 may be wound on an outer peripheral surface of the outer seating adapter 722 such that the outer seating adapter 722 may receive the driving force of the seating driving device 68. As the outer seating adapter 722 is rotated, the seating transfer member 72 may be rotated about the rotation axis of the carriage "C".

An inner seating adapter 721 may be connected to an end of the seating transfer member 72, which is located on an inside of the housing 12. The inner seating adapter 721 transfers the driving force to the seating rollers 3531. Accordingly, as the seating transfer member 72 is rotated about the rotational direction, the seating roller 3531 is rotated. That is, through the seating transfer member 72, the driving force of the seating driving device 68 is transferred to the seating rollers 3531 to rotate the seating rollers 3531.

The elements of the working fluid delivering element 73 may be formed in the seating transfer member 72. The working fluid delivering element 73 may include a working fluid line 731 that is a passage that passes the seating transfer members 72 leftwards and rightwards such that the working fluid may flow through an interior thereof. That is, in an embodiment of the present disclosure, the working fluid line 731 is a slot formed in the seating transfer member 72. However, the working fluid line 731 may be a separate pipe member.

A working fluid outlet may be provided. An inner working fluid outlet 733 is an element, through which the seating transfer member 72 passes through the seating transfer member 72 from the working fluid line 731 such that the working fluid is discharged to the rotation gripping part 352. An outer working fluid outlet 713 is a hole that passes through an inside and an outside of the rotation transferring member 71. While the rotation transferring members 71 are rotated relatively, the gripper line and the inner working fluid outlet 733 are communicated with each other by the outer working fluid outlet 713.

A plurality of inner working fluid outlets 733 may be provided. The plurality of outer working fluid outlets 713 may be configured to correspond to the number of the inner working fluid outlets 733. The number of the working fluid lines 731 also may correspond to the number of the inner working fluid outlets 733 such that the working fluid lines 731 correspond to the inner working fluid outlets 733, respectively. It is illustrated in an embodiment of the present disclosure that six inner working fluid outlets 733 may be formed and a total of six outer working fluid outlets 713 and a total of six working fluid lines 731 are formed, but the numbers thereof are not limited thereto, and their numbers may be four as another example.

The plurality of inner working fluid outlets 733 may be formed on a spiral that is wound on an outer peripheral surface of the seating transfer member 72 along the rotational direction at a specific interval. Although the inner working fluid outlet 733 may be disposed such that the adjacent inner working fluid outlets 733 have an included angle of 45 degrees in a cross-section obtained by cutting the seating transfer member 72 by a plane that is perpendicular to the rotational direction, the included angle is not limited thereto. The plurality of outer working fluid outlets 713 may be disposed on the outer peripheral surface of the rotation transferring member 71 along the rotational direction at a specific interval, or may be disposed along the spiral in the same way as that of the inner working fluid outlets 733.

The inner working fluid outlets 733 may be provided in an area, in which the above-described groove of the seating transfer member 72 is formed. Furthermore, the outer working fluid outlets 713 may be disposed in a recess that is formed on an inner surface of the rotation transferring member 71, in which grooves are formed in a radially outward direction at a specific interval, to correspond to the area, in which the groove of the seating transfer member 72 is formed. An annular passage may be formed in the area, in which the groove is formed, between the outer surface of the seating transfer member 72 and the inner surface of the rotation transferring member 71 such that all of the inner working fluid outlets 733 and the outer working fluid outlets 713 are communicated with the corresponding passages even though they are not aligned to coincide with each other when the rotation transferring member 71 and the seating transfer member 72 are rotated relatively. Accordingly, a situation, in which the working fluid may be delivered to the rotation gripping part 352, may be consistently maintained.

The working fluid delivering element 73 may include a working fluid inlet 732, through which the working fluid is introduced into the working fluid line 731. The working fluid inlet 732 may be formed at an end of the seating transfer member 72, which is located on an outside of the housing 12. The working fluid inlet 732 may be provided in the area, in which the groove of the seating transfer member 72 is formed, may be communicated with an outer inlet 751, and may receive the working fluid through a working fluid providing pipeline connected to the outer inlet 751. That is, when the outer inlet 751 and the working fluid inlet 732 are aligned with each other to be communicated with each other, the working fluid providing pipeline may deliver the working fluid to the outer inlet 751 and the outer inlet 751 may deliver the working fluid to the working fluid inlet 732 whereby the working fluid may finally reach the working fluid line 731.

The transfer member holder 75 may be coupled to an end of the seating transfer member 72, which is located on an outside of the housing 12. The transfer member holder 75 may be coupled to the seating transfer member 72 in a form, in which the transfer member holder 75 surrounds the seating transfer member 72. Accordingly, the seating transfer member 72 may be coupled to the transfer member holder in a form, in which an end of the seating transfer member 72 is inserted into a space 752 defined by the transfer member holder, and a shape of the inner surface of the transfer member holder 75 corresponds to a shape of the outer surface of the seating transfer member 72.

In detail, grooves recessed in a radially outward direction and protrusions protruding further in a radially inward direction may be formed alternately leftwards and rightwards on the inner surface of the transfer member holder 75, and the grooves of the transfer member holder 752 may be disposed at a location corresponding to the groove of the seating transfer member 72, the outer inlet 751 may be disposed in the groove of the transfer member holder 75, and the protrusions of the transfer member bolder 75 may contact the protrusions of the seating transfer member 72. Rotation of the seating transfer member 72 may be stably supported by disposing bearings between the contacting protrusions.

The relationship is similar to shapes of the convexo-concave area of the seating transfer member 72 located on the inside of the housing 12, and a portion of the inner surface of the rotation transferring member 71 that surrounds the area. Accordingly, the inner surface of the transfer member holder 75 and the outer surface of the seating transfer member 72 contact each other, and are spaced apart from each other in the area, in which the groove is formed, to form an annular passage. The annular passage may be communicated by the corresponding passage even though all of the outer inlet 751 and the working fluid inlet 732 are not aligned with each other when the seating transfer member 72 is rotated in a state, in which the transfer member holder 75 is fixed. Accordingly, a situation, in which the working fluid may be delivered to the working fluid lines 731 may be consistently maintained.

The transfer member holder 75 is an element that fixes the seating transfer member 72 outside the housing 12. The outer inlet 751 may be an opening that is formed as the transfer member holder 75 that surrounds the seating transfer member 72 and is coupled to the seating transfer member 72 passes therethrough from an inner side to an outer side. The working fluid inlet 732 also may be an opening that passes through the working fluid line 731 and the outer surface of the seating transfer member 72. The working fluid providing pipeline (not illustrated) may be connected to a working fluid source (not illustrated), in which the working fluid is contained, may be connected to the outer surface of the transfer member holder 75, and may provide the working fluid to the outer inlet 751 formed in the transfer member holder 75.

A plurality of working fluid inlets 732 may be provided, and may be connected to the working fluid lines 731, respectively. The plurality at outer inlets 751 may be configured to correspond to the number of the working fluid inlets 732. In an embodiment of the present disclosure, because six working fluid lines 731 may be disposed, six working fluid inlets 732 and six outer inlets 751 may be provided, but the numbers thereof are not limited thereto, and their numbers may be four in another example.

The plurality of working fluid inlets 732 may be formed on a spiral that is wound on an outer peripheral surface of the seating transfer member 72 along the rotational direction at a specific interval. Although the working fluid inlet 732 may be disposed such that the adjacent working fluid inlets 732 have an included angle of 45 degrees in a cross-section obtained by cutting the seating transfer member 72 perpendicularly to the extension direction, the included angle is not limited thereto. The plurality of outer inlets 751 may be disposed on the outer peripheral surface of the transfer member holder 75 along the rotational direction at a specific interval, or may be disposed along the spiral in the same way as that of the inner working fluid inlets 732.

Due to the above-described disposition, all of the working fluid inlets 732 and the outer inlets 751 may be aligned with each other to be communicated with each other when the seating transfer member 72 is disposed at a specific location, and the working fluid may be delivered to the interior of the housing 12.

When the rotation transferring member 74 is rotated to rotate the carriage "C", the carriage "C" has to be fixed to the seating transfer member 72 and thus is not rotated, whereby the rotation transferring member 71 and the seating transfer member 72 may be rotated relatively. In this situation, due to the above-described structure, the working fluid may be provided from the working fluid source to the working fluid lines 731, through the outer inlets 751 and the working fluid inlets 732.

The transfer unit 70 may include a transfer part guide 74. When the rotation transferring member 71 passes through the housing 12, the transfer part guide 74 may be disposed between the housing 12 and the rotation transferring member 71. Accordingly, the transfer part guide 74 may be formed to surround a portion of the outer peripheral surface of the rotation transferring member 71. The transfer part guide 74 may include a bearing that supports the rotation transferring member 71 on an inside thereof to support rotation of the rotation transferring member 71, and may include a packing formed of a flexible material to maintain an airproof state and a waterproof state, at a border of the transfer unit 70 and the housing 12. Furthermore, the transfer part guide 74 may have a shape that extends by a specific length along the rotational direction to support the rotation transferring member 71, and may be coupled to the inner surface or the outer surface of the housing 12 through a fastening member. Accordingly, a problem, such as a braking or deformation that is caused when an excessively high load is applied to the rotation transferring member 71 at a location, at which the rotation transferring member 71 and the housing 12 meet each other, may be prevented.

The transfer unit 70 may further include a transfer support member 76. Due to characteristics of the rotation part 35, by which the carriage "C" is seated and rotated, the rotation transferring member 71 may be disposed at a location that is spaced apart from a ground surface at a specific height. Accordingly, a structure for locating the rotation transferring member 71, the seating driving device 68, and the like at a specific height, and stably supporting them may be necessary, and the transfer support member 76 may perform the function. The transfer support member 76 may be located outside the housing 12 and may stand up on the ground surface to have a specific height, and the rotation transferring member 71, the transfer member holder 75, the seating driving device 68, and the like may be seated on the transfer support member 76 to be supported.

The sterilizer 1 according to an embodiment of the present disclosure may have the above-described transfer unit 70, and thus the pipelines and the power transmitting structure may be rotated relatively without being twisted with each other, and the structures located in the interior of the housing 12 may be rotated while locations of the elements that generate power are fixed to the outside of the housing 12. Accordingly, a configuration difficulty in installing the seating driving device 68 that generates power for rotating the carriage seating part 353 in the rotation part frame 351 and operating the seating driving device 68 may be solved. Furthermore, a configuration difficulty in installing a structure that controls the working fluid that is to be supplied to the rotation gripping part 352 in the rotation part frame 351 may be solved.

Intermediate Door Part 53

Figure 16:
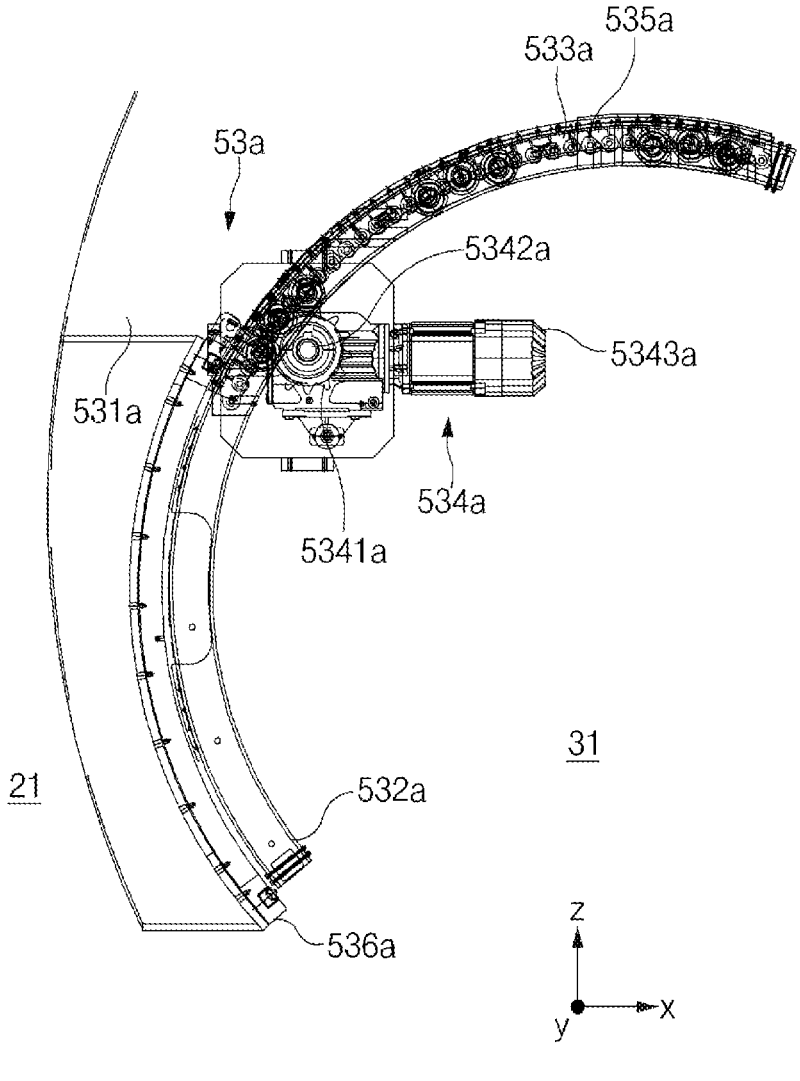
FIG. 16 is a cross-sectional view obtained by cutting an intermediate door part of a sterilizer by a plane that is perpendicular to a rotational direction in a state, in which an intermediate door is disposed at an opening location, according to an embodiment of the present disclosure.
Figure 17:
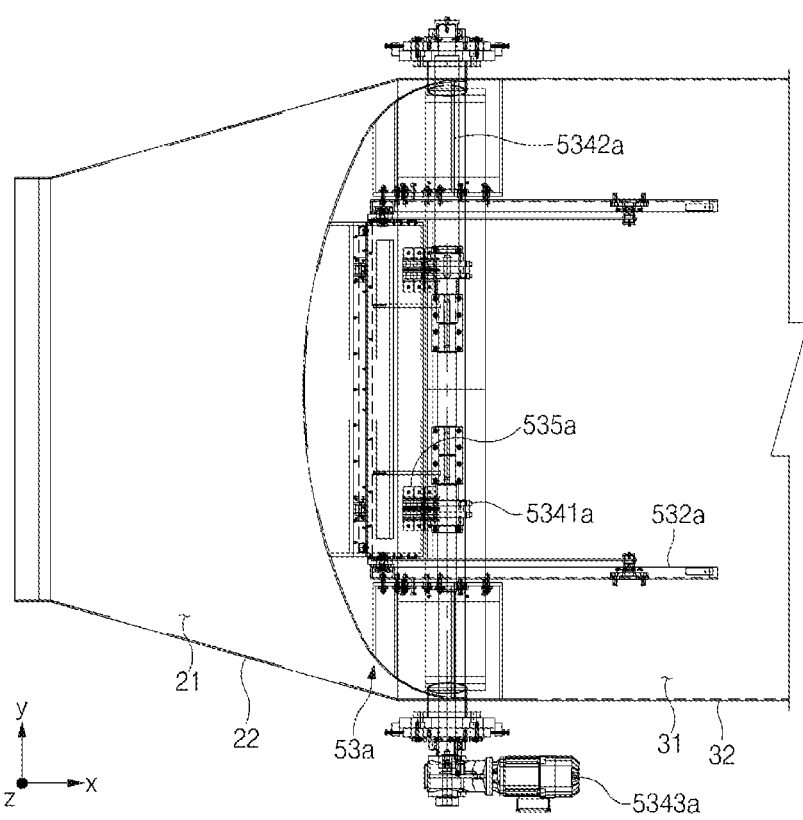
FIG. 17 is a cross-sectional view obtained by cutting an intermediate opening/closing part of a sterilizer by a plane that is perpendicular to an entrance direction according to an embodiment of the present disclosure.
Figure 18:
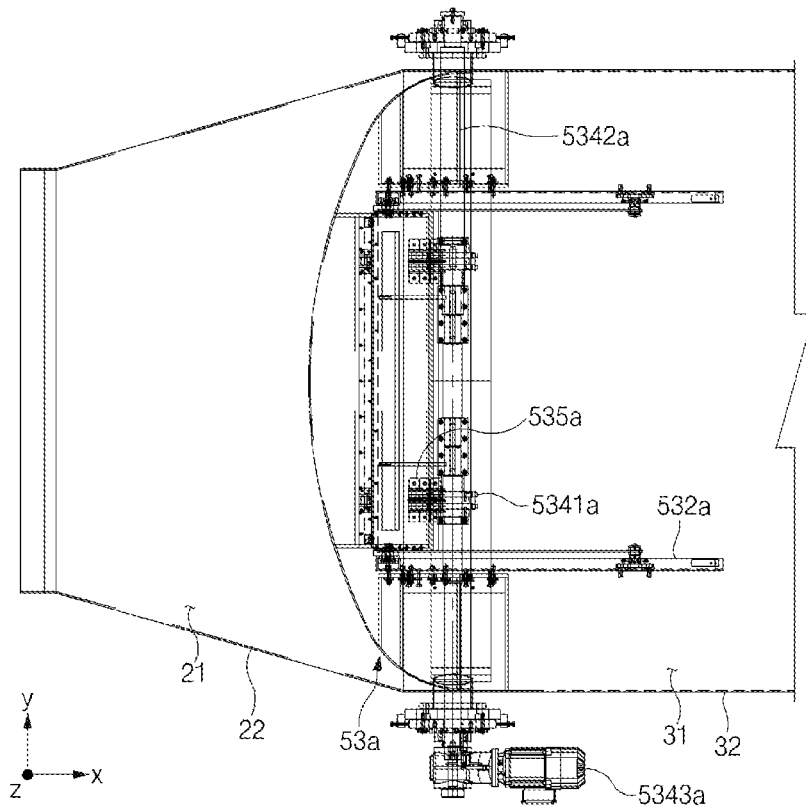
FIG. 18 is a cross-sectional view obtained by cutting an intermediate opening/closing part of a sterilizer by a plane that is perpendicular to a vertical direction according to an embodiment of the present disclosure.
Figure 19:
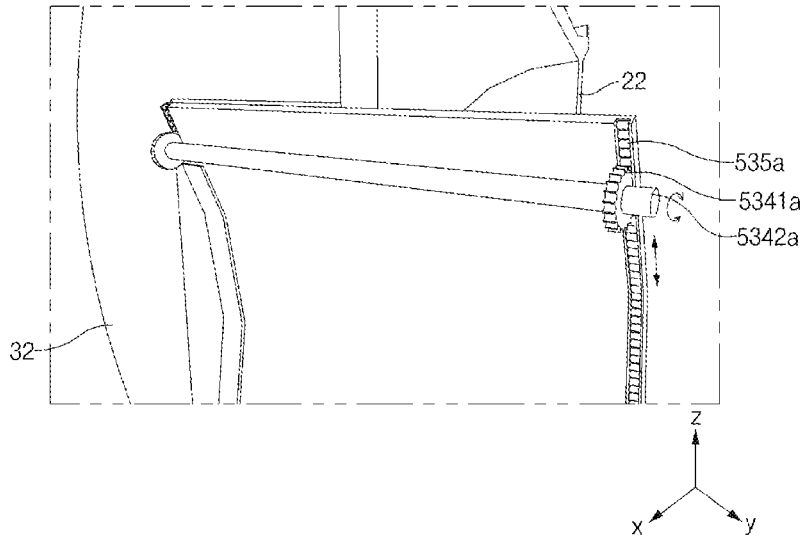
FIG. 19 is a view conceptually illustrating an intermediate door part of a sterilizer in a state, in which an intermediate doom is disposed at a closing location, according to an embodiment of the present disclosure.
Figure 20:
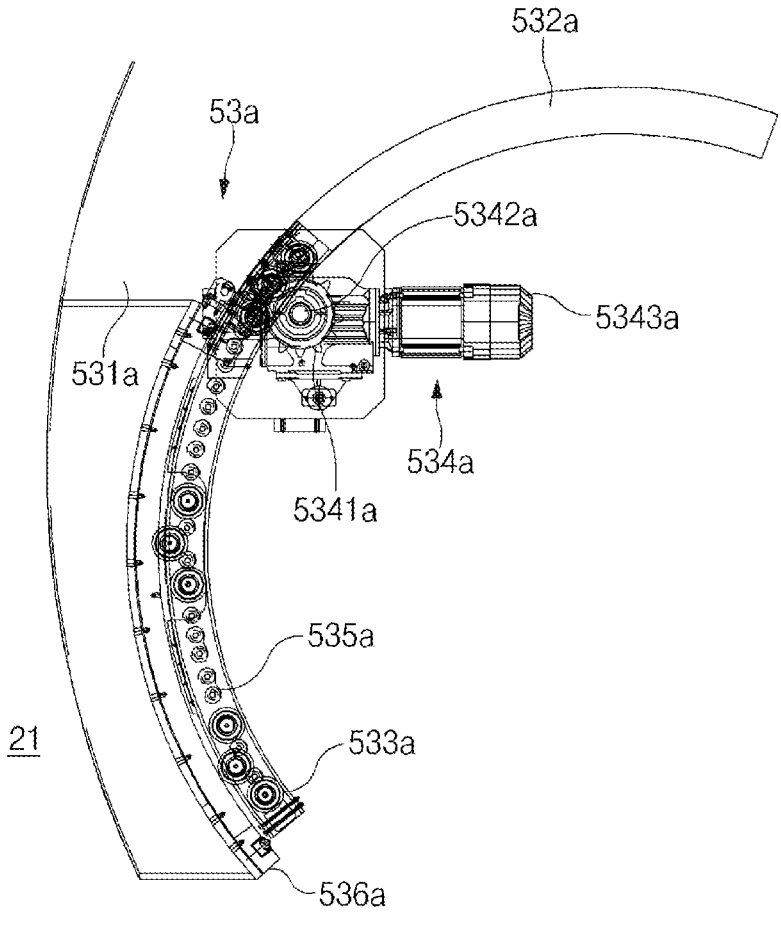
FIG. 20 is a cross-sectional view obtained by cutting an intermediate opening/closing part of a sterilizer by a plane that is perpendicular to a rotational direction in a state, in which an intermediate door is disposed at a closing location, according to an embodiment of the present disclosure.

FIG. 16 is a cross-sectional view obtained by cutting the intermediate opening/closing part 53 of the sterilizer 1 by a plane that is perpendicular to the rotational direction in a state, in which the intermediate door 533*a* is disposed at an opened location, according to an embodiment of the present disclosure. FIG. 17 is a cross-sectional view obtained by cutting the intermediate door part 53 of the sterilizer 1 by a plane that is perpendicular to the entrance direction D1 according to an embodiment of the present disclosure. FIG. 18 is a cross-sectional view obtained by cutting the intermediate opening/closing part 53 of the sterilizer 1 by a plane that is perpendicular to a vertical direction according to an embodiment of the present disclosure. FIG. 19 is a view conceptually illustrating the intermediate door part 53 of the sterilizer 1 in a state, in which the intermediate door is disposed at a closing location, according to an embodiment of the present disclosure. FIG. 20 is an enlarged detailed view of a portion of a cross-section obtained by cutting the intermediate opening/closing part 53 of the sterilizer 1 by a plane that is perpendicular to the rotational direction in a state, in which the intermediate door 533*a* is disposed at a closing location, according to an embodiment of the present disclosure.

The intermediate door part 53 is an element that is disposed in each of the front and rear sides of the sterilization module 30 to distinguish the sterilization space 31 from the outside and selectively open and close the entrance of the sterilization module 30 and has a curved shape. Accordingly, a plurality of intermediate door parts 53 may be provided. Although it is illustrated in an embodiment of the present disclosure that the sterilizer 1 has two intermediate opening/closing parts 53*a* and 34*b*, the number thereof is not limited thereto. The opening/closing module 50 includes the intermediate door part 53.

The configuration of the front intermediate door part 53*b* is disposed to be symmetrical to the rear intermediate door part 53*a* with respect to the sterilization module 30 when viewed along the rotational direction, and thus they are very similar, and a description of a door frame 531*b*, the intermediate door 533*b*, and a door guide 532*b* that are elements of the front intermediate door part 53*b* will be replaced by a description of the rear intermediate door part 53*a*.

The intermediate door part 53 may include a door frame 531*a*, the intermediate door 533*a*, and a door guide 532*a*, and may be closed such that the carriage "C" cannot pass or opened such that the carriage "C" may pass due to the relative movements of the elements.

The door frame 531*a* is an element that is a frame of the intermediate door part 53, which has an intermediate opening, through which the carriage "C" may be introduced and extracted. The intermediate opening is an opening that is formed in the door frame 531*a* to have a size that is large enough such that the shape of the longitudinal section of the carriage "C" may be included and may have a rectangular shape when viewed from the front side, and the shape thereof is not limited thereto. By the intermediate opening, the sterilization space 31 is communicated with the outside of the sterilization module 30. However, the outside of the sterilization module 30 does not mean the outside of the sterilizer 1. That is, the sterilization space 31 and the temperature raising space 21 may be communicated with each other by the intermediate opening located on that rear side, and the sterilization space 31 and the cooling space 41 may be communicated with each other by the intermediate opening located on the front side.

The movement part 13 may be divided with respect to the door frame 531*a*. The heating movement part 23 and the first connection unit 33 may be divided with respect to the door frame 531*a* located on the rear side, and the cooling movement part 43 and the second connection unit 332 may be divided with respect to the door frame 531*a* located on the front side.

The intermediate door 533*a* is an element, a location of which may be changed as the intermediate opening formed in the door frame 531*a* is closed or opened. The intermediate door 533*a* may be coupled to the door guide 532*a* connected to the door frame 531*a* to be slid, and the intermediate door 533*a* may be slid along the door guide 532*a* to open and close the intermediate opening. That is, the door guide 532*a* guides sliding of the intermediate door 533*a*.

The door guide 532*a* may include two door guide rails disposed to be spaced apart from each other leftwards and rightwards. Left and right ends of the intermediate door 533*a* may be connected to the two door guide rails that are spaced apart from each other to be slid, and the intermediate door 533*a* may be slid along the door guide rails.

The intermediate door 533*a* may be slid along the door guide 532*a* to be located at the opening location and the closing location. The opening location is a location, at which the intermediate door 533*a* and the door guide 532*a* are disposed in a relative relationship to open the intermediate opening, and the closing location is a location, at which the intermediate door 533*a* and the door guide 532*a* are disposed in a relative relationship to close the intermediate opening.

The door guide 532*a* may guide the sliding of the intermediate door 533*a* such that a vertical height of the intermediate door 533*a* when the intermediate door 533*a* is disposed at the opening location is larger than a vertical height thereof when the intermediate door 533*a* is disposed at the closing location. Furthermore, the door guide 532*a* may guide the sliding of the intermediate door 533*a* such that the opening height, by which an upper end and a lower end of the intermediate door 533*a* are spaced apart from the opening location upwards and downwards, is larger than the closing height, by which the upper end and the lower end of the intermediate door 533*a* are spaced apart from the closing location upwards and downwards.

The door guide 532*a* may be formed to be gradually inclined as the intermediate door 533*a* is moved from the closing location to the opening location. As in FIG. 1, when the intermediate door 533*a* is located at the closing location in a situation, in which the sterilizer 1 is viewed, a line connecting an upper end and a lower end of the intermediate door 533*a* is a door orientation line. The door guide 532*a* may have a structure that guides the intermediate door 533*a* such that an angle that is defined in a relationship of the door orientation line with a horizontal plane as the intermediate door 533*a* is moved from the closing location to the opening location.

The intermediate door 533*a* may have a shape, a center of which protrudes from the sterilization space 31 toward an outside. The profile of a cross-section obtained by cutting the door guide 532*a*, as in FIG. 16, also may have a shape, a center of which protrudes from the sterilization space 31 toward the outside such that the intermediate door 533*a* is slid.

A profile of a cross-section obtained by cutting the door guide 532*a* by a plane that is perpendicular to the rotational direction may be curved, and the intermediate door 533*a* may be slid along the door guide 532*a*. The curved profile may have an arc shape. Accordingly, a center ("P" of FIG. 1) of the profile of the door guide 532*a* may be located in the sterilization space 31.

Because the intermediate door 533*a* and the door guide 532*a* are formed in this way, a height occupied by the intermediate door part 53 in the vertical direction may be reduced as compared with a case, in which the standing intermediate door 533*a* is opened and closed in the vertical direction is used, and thus a size of the entire sterilizer 1 may be reduced.

The intermediate door part 53 may further include a door gear 5341*a* that is rotated to transfer the driving force to the intermediate door 533*a*. The intermediate door 533*a* may include a door plate that may be slid along the door guide 532*a* to open and close the intermediate opening, and a plurality of enmeshing members 535*a* that are engaged with gear teeth of the door gear 5341*a* to transfer the driving force to the door plate. As the enmeshing members 535*a* are pushed when the door gear 5341*a* is rotated, the door plate may be moved to adjust opening/closing of the intermediate opening.

The plurality of enmeshing members 535*a* may be disposed at a specific interval according to a profile in a cross-section obtained by cutting the door plate as in FIG. 16. The enmeshing members 535*a* may extend in a cylindrical shape along the rotational direction, and may be coupled to the door plate to be rotatable about the rotational direction. Accordingly, when the door gear 5341*a* pushes out the enmeshing members 535*a*, the enmeshing members 535*a* may be rotated by the force. In this way, because the intermediate door 533*a* includes the freely rotatable enmeshing members 535*a*, wearing of the door gear 5341*a* may be reduced as compared with a situation, in which the door plate is opened and closed by using gear teeth.

The shape of the door gear 5341*a* also may have a profile having a continuous curve that is convex radially inwards to correspond to the cylindrical enmeshing members 535*a*. The gear teeth of the door gear 5341*a* may be defined between concave valleys to correspond to cylindrical outer surfaces of the enmeshing members 535*a*. The enmeshing members 535*a* may be located in the concave valleys, and may be pressed by the gear teeth when the door gear 5341*a* is rotated.

In other words, the gear teeth of the door gear 5341*a* may be inserted into spaces between two adjacent ones of the plurality of enmeshing members 535*a*, and the door gear 5341*a* may be rotated to apply a force to any one of the two adjacent enmeshing members 535*a*. Because a location of the door gear 5341*a* is fixed, the enmeshing members 535*a* are pushed out by the door gear 5341*a*, and the door plate connected to the enmeshing members 535*a* may be slid along the door guide 532*a*.

The plurality of enmeshing members 535*a* may be spaced apart from each other leftwards and rightwards further to be disposed in areas that are adjacent to the left and right ends of the door plate. That is, the enmeshing members 535*a* are not disposed over the entire area of the door plate as they go leftwards and rightwards, but may be disposed only in the areas that are adjacent to the left and right ends of the door plate while the enmeshing members 535*a* are not disposed at a central portion of the door plate. Accordingly, because the door gear 5341*a* is not located at the central area of the intermediate opening but is disposed adjacent to a periphery of the intermediate opening, it may not hinder entrance of the carriage "C" through the intermediate opening.

The door gear 5341*a* may be rotated about the rotational direction. The sterilizer 1 according to an embodiment of the present disclosure may further include a door driving device 5343*a* that generates the driving force for driving the intermediate door 533*a* and is located outside the sterilization housing 32, and a door power transferring shaft 5342*a* that transfers the driving force of the door driving device 5343*a* to the door gear 5341*a*. The door power transferring shaft 5342*a* also may be rotated about the rotational direction, and thus the door gear 5341*a* connected thereto also may be rotated about the rotational direction. Accordingly, as the door gear 5341*a* is rotated, a force is applied to the enmeshing members 535*a* in an arbitrary direction that is perpendicular to the rotational direction, and the door may be slid. The door power transferring shaft 5342*a* may pass through the sterilization housing 32, and may be connected to the door driving device 5343*a* and the door gear 5341*a* to transfer the driving force generated by the door driving device 5343*a* to the door gear 5341*a*. The door gear 5341*a*, the door driving device 5343*a*, and the door power transferring shaft 5342*a* may be included in door driving assemblies 534*a* and 344*b*.

The intermediate door part 53 may further include an intermediate packing 536*a*. The intermediate packing 536*a* is an element that is formed along a circumference of the door frame 531*a* that defines the intermediate opening, and may be located between the door frame 531*a* and the intermediate door 533*a* to block a space between the door frame 531*a* and the intermediate door 533*a* when the intermediate door 533*a* is located at the closing location so as to maintain an airproof state or a waterproof state. Accordingly, the intermediate packing 536*a* may have a rectangular shape, a center of which is opened, when viewed from a front side, and may be formed of a flexible material to easily maintain an airproof state or a waterproof state.

Shape of Housing 12

A shape of the housing 12 will be described with reference to FIGS. 1 and 2. The housing 12 according to an embodiment of the present disclosure, as illustrated, may be formed such that a cross-sectional area thereof increases as it goes to the front side, in an area of the temperature raising module 20. Then, the cross-sectional area may be a cross-sectional area obtained by cutting the housing 12 by a plane that is perpendicular to the entrance direction D1. Furthermore, the housing 12 may be formed such that a cross-sectional area thereof decreases as it goes from an area of the cooling space 41 to the front side. Furthermore, the housing 12 may be formed such that a cross-sectional area thereof is constant as it goes from an area of the sterilization module 30 to the front side.

In more detail, a height of a lower end on an outer surface of the housing 12 may be the same even though it goes to the front side, a height of an upper end thereof may increase in an area of the temperature raising module 20 as it goes to the front side, may decrease in an area of the cooling module 40, and may be constant in an area of the sterilization module 30. That is, a height of the shape of the housing 12 viewed as in FIG. 1 may increase as it goes to a center thereof, and may be maintained constantly when it is adjacent to the center.

The housing 12 may have an external appearance of a shape having a varying cross-section as described above not to have an unnecessary interior space. An inlet and an outlet of the housing 12 may be opened and closed by the inlet door part 51 and the outlet door part 52.

Figure 21:
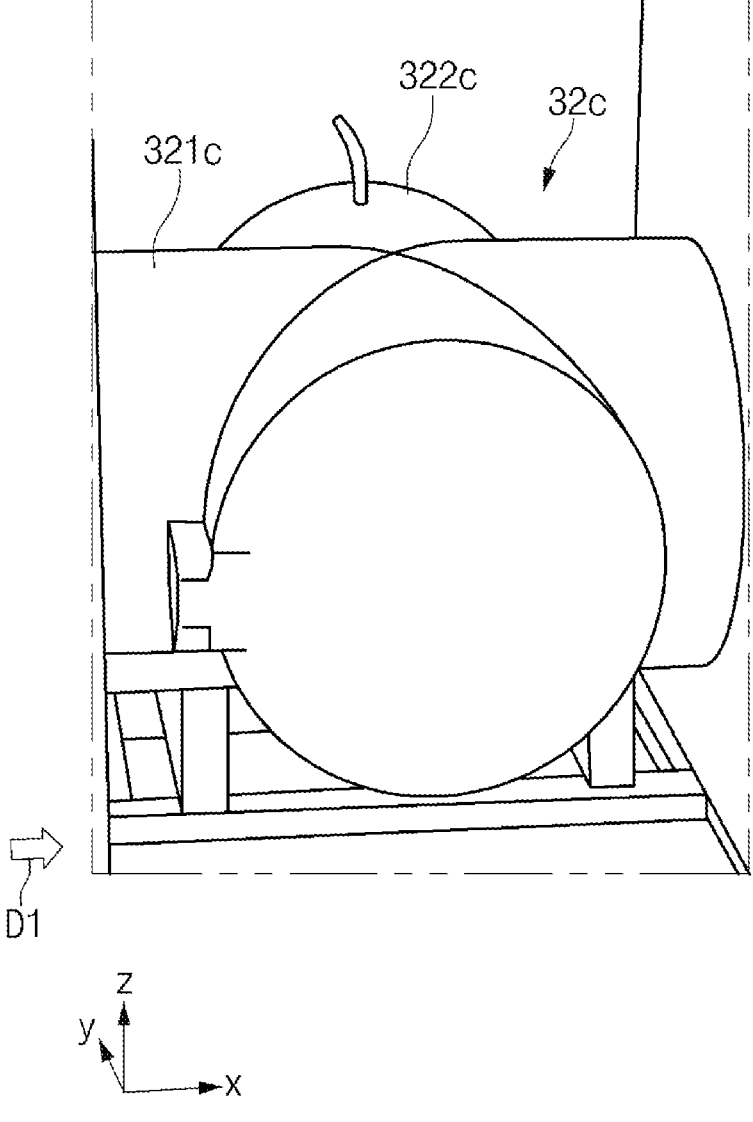
FIG. 21 is a perspective view of a sterilization housing according to another embodiment of the present disclosure.

Meanwhile, among the housings 12, the sterilization housing 32, as illustrated in FIGS. 1 and 2, may not have a hollow cylindrical shape, and may be formed as in another embodiment of FIG. 21.

FIG. 21 is a perspective view of the sterilization housing 32 according to another embodiment of the present disclosure.

Referring to the drawing, the sterilization housing 32 according to another embodiment of the present disclosure may have a cross (+) shape when viewed along a vertical direction. Accordingly, the sterilization housing 32 may include a front/rear housing 321c that extends forwards and rearwards, and a left/right housing 322c that extends leftwards and rightwards, and the cross shape may be formed as the entrance direction housing 321c and the rotational direction housing 322c may cross each other to form the cross shape.

A leftward/rightward width of the rotation part frame may be larger than a leftward/rightward width of the sterilization movement part. This is because the sterilization movement part includes only a structure for feeding the carriage "C" simply to the front side, whereas the rotation part frame includes the carriage seating part for seating and feeding the carriage "C", and structures for rotating the carriage "C". Accordingly, the rotation part and the sterilization movement part form the cross shape when viewed from a top to a bottom, and the sterilization housing 32c that surrounds them also may have a cross shape. An external appearance of the sterilization housing 32c may have a cross shape as illustrated, and a shape of an inner surface thereof may have a cross shape whereby the sterilization housing 32c may accommodate the rotation part and the sterilization movement part, which have been described above.

The driving devices that generate driving forces, which have been described in an embodiment of the present disclosure, may be motors that generate rotational forces by using electric power or combustion engines that generate rotational forces by using fossil fuels. However, the kinds of the elements that constitute the driving devices are not limited thereto.

Although it may have been described until now that all the elements constituting the embodiments of the present disclosure are coupled to one or coupled to be operated, the present disclosure is not essentially limited to the embodiments. That is, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not extruded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

The invention claimed is:

1. A sterilization module comprising:
   a sterilization housing having an interior space, in which a carriage is accommodated;
   a sterilization/heat-treating device configured to heat-treat the carriage accommodated in the interior space of the sterilization housing;
   a connection part provided in the interior space of the sterilization housing, and configured to move the carriage forwards; and
   a rotation part configured to rotate the carriage about a rotation axis of the carriage while gripping the carriage,
   wherein the rotation axis of the carriage intersects an entrance direction that is a direction in which the carriage enters the rotation part.

2. The sterilization module of claim 1, wherein the rotation part includes:
   a rotation part frame configured to receive the carriage;
   a rotation driving part configured to transfer a driving force for rotating the rotation part frame about the carriage rotary shaft;
   a rotation gripping part installed in the rotation part frame, and configured to grip the carriage; and
   a carriage seating part installed in the rotation part frame, and configured to support a lower surface of the carriage.

3. The sterilization module of claim 2, wherein the rotation gripping part includes a gripping part pusher configured to grip the carriage by pressing the carriage in a direction that is perpendicular to the carriage seating part when a working fluid is supplied thereto, and releasing the gripping of the carriage by releasing the pressing when the working fluid is discharged.

4. The sterilization module of claim 3, wherein the gripping part pusher is formed to cover an upper end of the carriage so as to restrain the carriage from deviating.

5. The sterilization module of claim 2, wherein the carriage seating part includes seating rollers, by which the carriage is moved in one direction.

6. The sterilization module of claim 5, wherein the seating rollers are fixed such that the carriage is not moved while the rotation part is rotated.

7. The sterilization module of claim 5, wherein the connection part includes a first connection unit and a second connection unit provided while the carriage seating part being interposed therebetween, and
   wherein the first connection unit moves the carriage from an inlet of the sterilization module to the carriage seating part, and the second connection unit moves the carriage from the carriage seating part to an outlet of the sterilization module.

8. The sterilization module of claim 7, wherein the sterilization housing has a cross (+) shape with respect to a cross-section when viewed vertically downwards.

9. The sterilization module of claim 8, wherein widths of the first connection unit and the second connection unit are smaller than a width of the rotation part.

10. The sterilization module of claim 2, wherein the rotation driving part is disposed on an outside of the sterilization housing, and wherein the rotation part further includes a transfer unit that passes through the sterilization housing to transfer the driving force from the rotation driving part to the rotation part frame.

11. The sterilization module of claim 10, wherein the transfer unit includes:

a rotation transfer member configured to transfer the driving force to the rotation part frame; and a working fluid delivering element configured to deliver a working fluid for operating the rotation gripping part to the rotation gripping part, and wherein the rotation transfer member is driven independently from the working fluid delivering element.

12. The sterilization module of claim 11, further comprising:

a seating driving part disposed on an outside of the sterilization housing, and configured to generate a rotational driving force that is transferred to the carriage seating part, wherein the transfer unit further includes a seating transfer member configured to a driving force generated by the seating driving part to the carriage seating part, and wherein the seating transfer member is driven independently from the rotation transfer member.

13. The sterilization module of claim 12, wherein the working fluid delivering element is provided on an inside of the seating transfer member, has a shape that extends in a direction that is parallel to the carriage rotary shaft, and defines a working fluid line that is a passage, in which the working fluid flows through an interior thereof.

14. The sterilization module of claim 13, wherein the working fluid delivering element further includes an inner working fluid outlet that passes through the seating transfer member from the working fluid line to an outer surface thereof such that the working fluid is delivered to the rotation gripping part along the working fluid line, and wherein the rotation transfer member includes an outer working fluid outlet that is connected to an outer surface of the rotation transfer member and the rotation gripping part to communicate a gripper line that delivers the working fluid to the rotation gripping part and the inner working fluid outlet.

15. The sterilization module of claim 1, further comprising:

a plurality of intermediate opening/closing parts configured to divide the interior space of the sterilization housing from an outside to open and close the interior space, and disposed on front and rear sides of the sterilization module, respectively.

16. The sterilization module of claim 1, wherein the sterilization/heat-treating device is disposed on an upper side of an inner surface of the sterilization housing, and heat-treats a thermal medium by providing the thermal medium to the interior space, and wherein the thermal medium is hot water that is heated water.

17. A carriage treating module comprising:

a carriage housing having a carriage space, in which a carriage is accommodated;

a connection part disposed in the carriage space, and configured to move the carriage forward;

a heat treating device disposed in the carriage space, and configured to apply a specific heat treatment to a product located in the carriage; and a rotation part configured to grip the carriage delivered from the connection part, and configured to rotate the carriage about a rotation axis of the carriage in the carriage space, wherein the rotation axis of the carriage intersects an entrance direction that is a direction in which the carriage enters the rotation part.

* * * * *